(12) United States Patent
Tsuge et al.

(10) Patent No.: US 12,712,232 B2
(45) Date of Patent: Aug. 18, 2026

(54) POWER STORAGE DEVICE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Akihito Tsuge, Kariya (JP); Hiromi Ueda, Kariya (JP); Naoto Morisaku, Kariya (JP); Shigeru Fukuda, Nagoya (JP); Satoshi Morioka, Okazaki (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 595 days.

(21) Appl. No.: 18/207,434

(22) Filed: Jun. 8, 2023

(65) Prior Publication Data

US 2023/0402698 A1 Dec. 14, 2023

(30) Foreign Application Priority Data

Jun. 10, 2022 (JP) ................................ 2022-094672

(51) Int. Cl.

*H01M 10/625* (2014.01)
*H01M 10/613* (2014.01)
*H01M 10/6557* (2014.01)
*H01M 50/242* (2021.01)
*H01M 50/262* (2021.01)
*H01M 50/298* (2021.01)

(52) U.S. Cl.

CPC ....... *H01M 50/262* (2021.01); *H01M 10/613* (2015.04); *H01M 10/6557* (2015.04); *H01M 50/242* (2021.01); *H01M 50/298* (2021.01)

(58) Field of Classification Search

None
See application file for complete search history.

(56) References Cited

U.S. PATENT DOCUMENTS

2015/0303435 A1* 10/2015 Ikeda ................. H01M 50/502 429/121
2021/0175586 A1* 6/2021 Haruki ................ H01M 50/298
2023/0038951 A1* 2/2023 Kim ................. H01M 10/0481

FOREIGN PATENT DOCUMENTS

JP 2015-207394 A 11/2015

* cited by examiner

*Primary Examiner* — Yoshitoshi Takeuchi
(74) *Attorney, Agent, or Firm* — Sughrue Mion, PLLC

(57) ABSTRACT

A power storage device including a module stacked body having power storage modules stacked in a first direction and having a side surface extending in the first direction and a second direction orthogonal to the first direction; first and second restraint plates stacked on both sides of the body in the first direction and applying a restraint load; and a guide member, coupled to the restraint plates, and including a wiring guide portion guiding a wiring connected to the body, and an extending portion, connected to the wiring guide portion and extending in the first direction, including a fixing portion in an end portion of the extending portion and fixed to the first restraint plate; and an engagement portion in another end portion of the extending portion and engaged with the second restraint plate so as to be movable in the first and second directions when the storage modules expand/contract.

12 Claims, 16 Drawing Sheets

1
21b
10a(10)
19
9
III
11a(11)
8A(8)
10a(10)
II
D2
19
9
21
21c
21a
4
9
L
17
2e
2c
3
2a
D3
8B(8)
17
III
2
II
D1

1A
21b
10a(10)
19
9
III
II
11a(11)
8A(8)
10a(10)
D2
4
21
21c
21a
L
2e
3
2a
8B(8)
D3
D1
14
2
17

POWER STORAGE DEVICE

CROSS REFERENCE TO RELATED APPLICATIONS

This application claims priority to Japanese Patent Application No. 2022-094672 filed on Jun. 10, 2022, the entire contents of which are incorporated by reference herein.

TECHNICAL FIELD

The present disclosure relates to a power storage device.

BACKGROUND

A known power storage device includes a module stacked body including a plurality of power storage modules, a wiring connected to the module stacked body, and a guide member guiding the wiring along a side surface of the module stacked body (for example, refer to Japanese Unexamined Patent Publication No. 2015-207394). In the battery pack disclosed in Japanese Unexamined Patent Publication No. 2015-207394, electric wires connected to a battery assembly are accommodated in a case provided on a side surface of the battery assembly.

SUMMARY

In the foregoing power storage device, the guide member may be damaged due to expansion and contraction of the module stacked body and the guide member having linear expansion coefficients different from each other.

An object of the present disclosure is to provide a power storage device capable of curbing damage to a guide member.

A power storage device according to an aspect of the present disclosure includes a module stacked body including a plurality of power storage modules stacked in a first direction and having a first side surface extending in the first direction and a second direction orthogonal to the first direction and a second side surface adjacent to the first side surface and extending in the first direction and a third direction orthogonal to the first side surface and the second direction; a first restraint plate and a second restraint plate stacked on both sides of the module stacked body in the first direction and applying a restraint load to the module stacked body in the first direction; a wiring connected to the module stacked body; and a guide member coupled to the first restraint plate and the second restraint plate and disposing the wiring on the first side surface. The guide member includes: a wiring guide portion extending in the second direction and guiding the wiring toward the second side surface; and a first extending portion connected to the wiring guide portion and extending in the first direction. The first extending portion includes: a first fixing portion provided in a first end portion that is one end portion of the first extending portion in the first direction and fixed to the first restraint plate; and a first engagement portion provided in a second end portion that is another end portion of the first extending portion in the first direction and engaged with the second restraint plate so as to be movable in the first direction and the second direction when the power storage modules expand and contract.

In the foregoing power storage device, since the wiring guide portion of each of the guide member extends in the second direction, the wiring can be guided in the second direction. The first extending portion of each of the guide member extends in the first direction, the first end portion of the first extending portion is fixed to the first restraint plate by the first fixing portion, and the second end portion of the first extending portion is engaged with the second restraint plate by the first engagement portion. Thus, the guide member can reliably dispose the wiring on the first side surface of the module stacked body without being detached from the first restraint plate and the second restraint plate. The first engagement portion is engaged with the second restraint plate so as to be movable in the first direction and the second direction. Thus, for example, if the module stacked body and the guide member expand and contract in the first direction and the second direction with linear expansion coefficients different from each other when the power storage device is abnormal, the first engagement portion moves in the first direction and the second direction while being coupled to the second restraint plate. In addition, if the module stacked body expands and contracts in the first direction when the power storage device is charged and discharged, the first engagement portion also moves in the first direction while being coupled to the second restraint plate. Accordingly, a difference in amount of expansion and contraction caused between the module stacked body and the guide member is absorbed, and damage to the guide member is curbed.

The guide member may further include a second extending portion connected to the wiring guide portion at a position spaced apart from the first extending portion in the second direction and extending in the first direction. The first extending portion may be provided at a place closer to the second side surface than the second extending portion. The second extending portion may include: a second fixing portion provided in a third end portion that is one end portion of the second extending portion in the first direction and fixed to the first restraint plate, and a second engagement portion provided in a fourth end portion that is another end portion of the second extending portion in the first direction and engaged with the second restraint plate so as to be movable in the first direction and the second direction. In this case, the second extending portion of each of the guide member extends in the first direction, the third end portion of the second extending portion is fixed to the first restraint plate by the second fixing portion so as to be movable in the second direction, and the fourth end portion of the second extending portion is engaged with the second restraint plate by the second engagement portion. Thus, the guide member can reliably guide the wiring along the side surface of the module stacked body while being coupled to the first restraint plate and the second restraint plate and without being detached from the first restraint plate and the second restraint plate. At least one of the first fixing portion and the second fixing portion is engaged with the first restraint plate so as to be movable in the second direction, and the second engagement portion is engaged with the second restraint plate so as to be movable in the first direction and the second direction. Thus, for example, if the module stacked body and the guide member expand and contract in the first direction and the second direction with linear expansion coefficients different from each other when the power storage device is abnormal, the first engagement portion and the second engagement portion move in the first direction and the second direction while being coupled to the second restraint plate. In addition, if the module stacked body expands and contracts in the first direction when the power storage device is charged and discharged, the first engagement portion and the second engagement portion also move in the first direction while being coupled to the second restraint plate.

Accordingly, a difference in amount of expansion and contraction caused between the module stacked body and the guide member is absorbed, and damage to the guide member is curbed.

The foregoing power storage device may further include a duct covering the first side surface and forming a space between the duct and the first side surface. A cooling fluid may flow along the second direction in the space. The wiring guide portion may divide the space in the first direction by a leg portion protruding in the third direction toward the first side surface. When the number of stacked power storage modules is increased, heat is likely to be trapped between the power storage modules. Since the number of blowers can be increased in this constitution, the power storage modules can be thoroughly cooled without having biased cooling efficiency. Moreover, since a blower can be provided for each of the divided spaces, the cooling fluid flowing in from each of the blowers is straightened by the wiring guide portion. As a result, it is possible to enhance the cooling effect.

The wiring guide portion may be spaced apart from each of the first end portion and the second end portion in the first direction and be spaced apart from each of the third end portion and the fourth end portion in the first direction. In this case, sizes of the divided spaces are unlikely to be biased. Thus, it is easy to enhance the cooling effect.

The first restraint plate may include a first edge portion adjacent to the module stacked body in the third direction when viewed in the first direction. The wiring guide portion may be disposed on the first edge portion and extend in the second direction along the first edge portion. The wiring guide portion may be connected to the first end portion close to a fifth end portion that is one end portion of the wiring guide portion in the second direction. The wiring guide portion may include a third fixing portion provided in a sixth end portion that is another end portion of the wiring guide portion in the second direction and fixed to the first restraint plate. The fifth end portion may be provided at a place closer to the second side surface than the sixth end portion. In this case, the wiring guide portion is connected to the first end portion of the first extending portion on the fifth end portion side. Since the first end portion is provided with the first fixing portion fixed to the first restraint plate, the fifth end portion side of the wiring guide portion is fixed to the first restraint plate. In addition, the wiring guide portion is also fixed to the first restraint plate by the third fixing portion provided in the sixth end portion. Moreover, the fifth end portion having the first extending portion connected thereto is provided at a place close to the second side surface. Thus, the guide member can be more firmly coupled to the first restraint plate and the second restraint plate.

A plurality of the guide members may be provided side by side in the second direction. In this case, a length of each of the guide members in the second direction can be shortened. Thus, when the module stacked body and the guide members expand and contract in the second direction with linear expansion coefficients different from each other, damage to the guide members is further curbed.

The guide member may include a wiring bundling portion bundling a plurality of the wirings together on the first side surface. In this case, a plurality of wirings can be efficiently guided.

The module stacked body may further include a current collector electrically connecting the power storage modules adjacent to each other in the first direction and provided between the power storage modules adjacent to each other in the first direction. The current collector may be provided with a flow channel through which a cooling fluid flows along the third direction. In this case, since the wiring guide portion is disposed on the first edge portion of the first restraint plate and extends in the second direction along the first edge portion, it is unlikely to interfere with the flow channel. Thus, the power storage modules can be efficiently cooled.

The second restraint plate may include a second edge portion adjacent to the module stacked body in the third direction when viewed in the first direction. The second edge portion may include: an inner surface facing the guide member in the first direction, and a recessed portion opening on the inner surface and extending in the second direction. The first engagement portion may be press-fitted into the recessed portion. In this case, it is possible to easily realize a constitution in which the first engagement portion can move in the first direction and the second direction while being engaged with the second restraint plate.

The first fixing portion may be inserted through a penetration hole penetrating the first restraint plate in the first direction or a penetration hole penetrating the first restraint plate in the third direction. In this case, the first fixing portion can be easily fixed to the first restraint plate.

The wiring may be connected to at least one of a voltage detector and a temperature detector disposed between the power storage modules adjacent to each other in the first direction. In this case, the state of the power storage modules can be monitored using an external device.

The foregoing power storage device may further include a wiring bending portion provided in an end portion of the wiring guide portion and bending the wiring from the first side surface toward the second side surface, the end portion being close to the second side surface. In this case, the wiring can be easily guided toward the second side surface.

BRIEF DESCRIPTION OF THE DRAWINGS

FIG. 11 is a side view of the power storage device in FIG. 1.

DETAILED DESCRIPTION

Hereinafter, embodiments of the present disclosure will be described in detail with reference to the accompanying drawings. In description of the drawings, the same reference signs are used for elements which are the same or equivalent, and duplicate description thereof will be omitted.

First Embodiment

Figure 1:
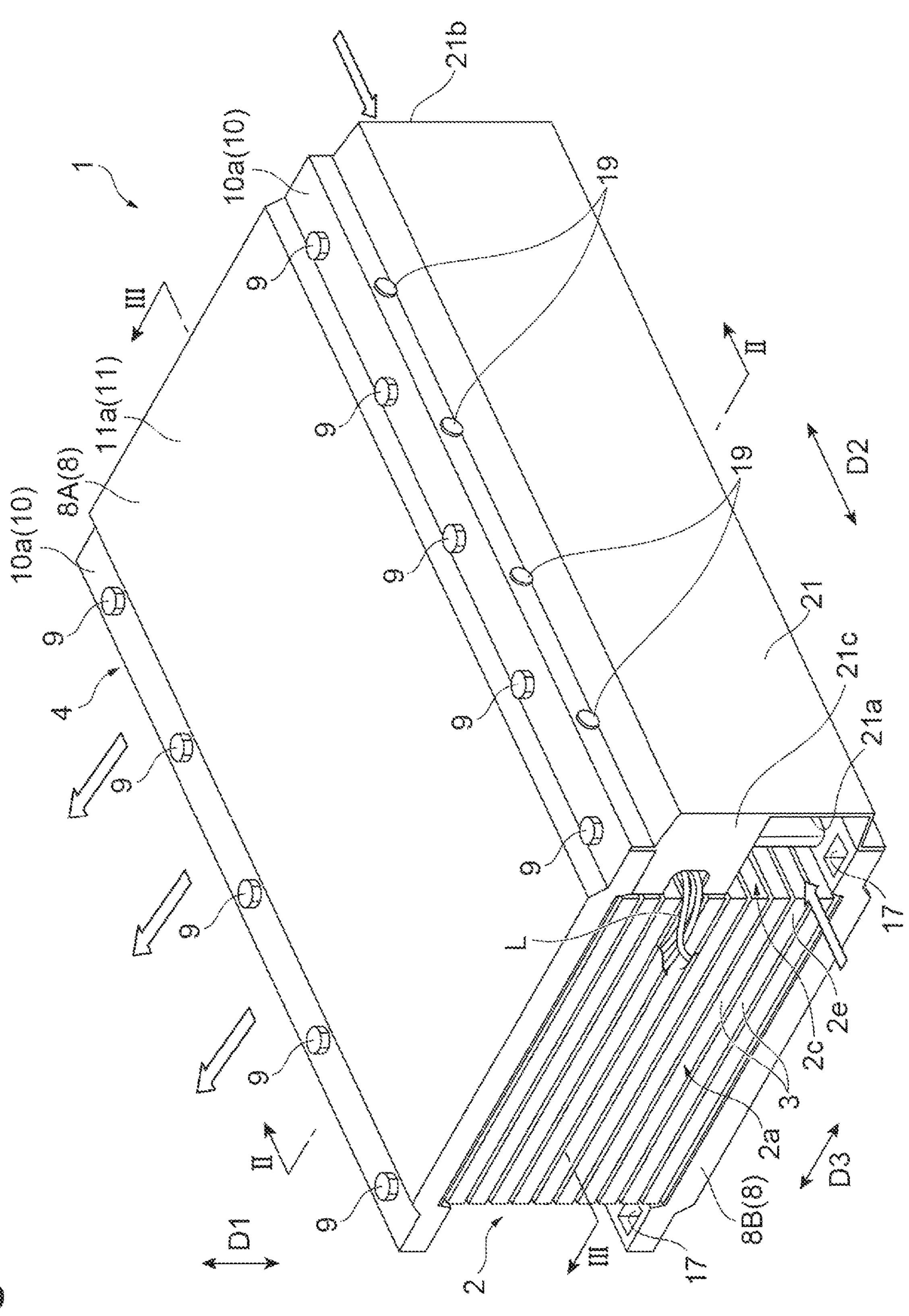
FIG. 1 is a perspective view of a power storage device according to a first embodiment.

With reference to FIGS. 1 to 13, a power storage device 1 according to a first embodiment will be described. For example, the power storage device 1 illustrated in FIG. 1 is used as a battery for various kinds of vehicles such as forklifts, hybrid cars, and electric cars. For example, the power storage device 1 is a secondary battery such as a nickel-hydride secondary battery or a lithium-ion secondary battery. For example, the power storage device 1 may be an electric double layer capacitor. In the present embodiment, a case where the power storage device 1 is a nickel-hydride battery will be described as an example.

As illustrated in FIGS. 1 to 13, the power storage device 1 includes a module stacked body 2, a restraint member 4, a pair of insulating plates 20, a duct 21, a pair of guide members 30, a guide member 60, a guide member 70, and a plurality of wirings L. The module stacked body 2 includes a plurality of power storage modules 3 stacked in a first direction D1, and a plurality of current collectors 5. In the present embodiment, the number of power storage modules 3 is ten, and the number of current collectors 5 is eleven. When the number of power storage modules 3 is ten, the number of wirings L need only be at least twelve.

The module stacked body 2 has substantially a rectangular parallelepiped shape. The module stacked body 2 has both end portions 2*a* and 2*b* in a second direction D2 orthogonal to the first direction D1. The module stacked body 2 has a side surface 2*c* and a side surface 2*d* connecting the end portion 2*a* and the end portion 2*b* to each other. The side surface 2*c* and the side surface 2*d* are directed in directions opposite to each other in a third direction D3 orthogonal to the first direction D1 and the second direction D2. The side surface 2*c* and the side surface 2*d* extend in the first direction D1 and the second direction D2.

The module stacked body 2 further has side surfaces 2*e* and 2*f* respectively adjacent to the side surface 2*c* and the side surface 2*d*. The side surface 2*e* is disposed in the end portion 2*a*. The side surface 2*f* is disposed in the end portion 2*b*. The side surface 2*e* and the side surface 2*f* face sides opposite to each other in the second direction D2. The side surface 2*e* and the side surface 2*f* extend in the first direction D1 and the third direction D3.

The plurality of power storage modules 3 are stacked in the first direction D1 with the current collectors 5 therebetween. The plurality of power storage modules 3 are electrically connected to each other in series with the current collectors 5 therebetween in the first direction D1. For example, the current collectors 5 are plate-shaped members made of a conductive material such as a metal. Examples of a material of the current collectors 5 include aluminum, copper, and stainless steel. The current collectors 5 may be a plurality of conductive members which are stacked with a conductive adhesive therebetween. For example, a plated layer of nickel or the like, a vapor deposition layer of carbon coating or the like, or a coating layer may be formed on a surface of each of the current collectors 5. In the present embodiment, a area of each of the current collectors 5 viewed in the first direction D1 is smaller than a area of each of the power storage modules 3.

Figure 2:
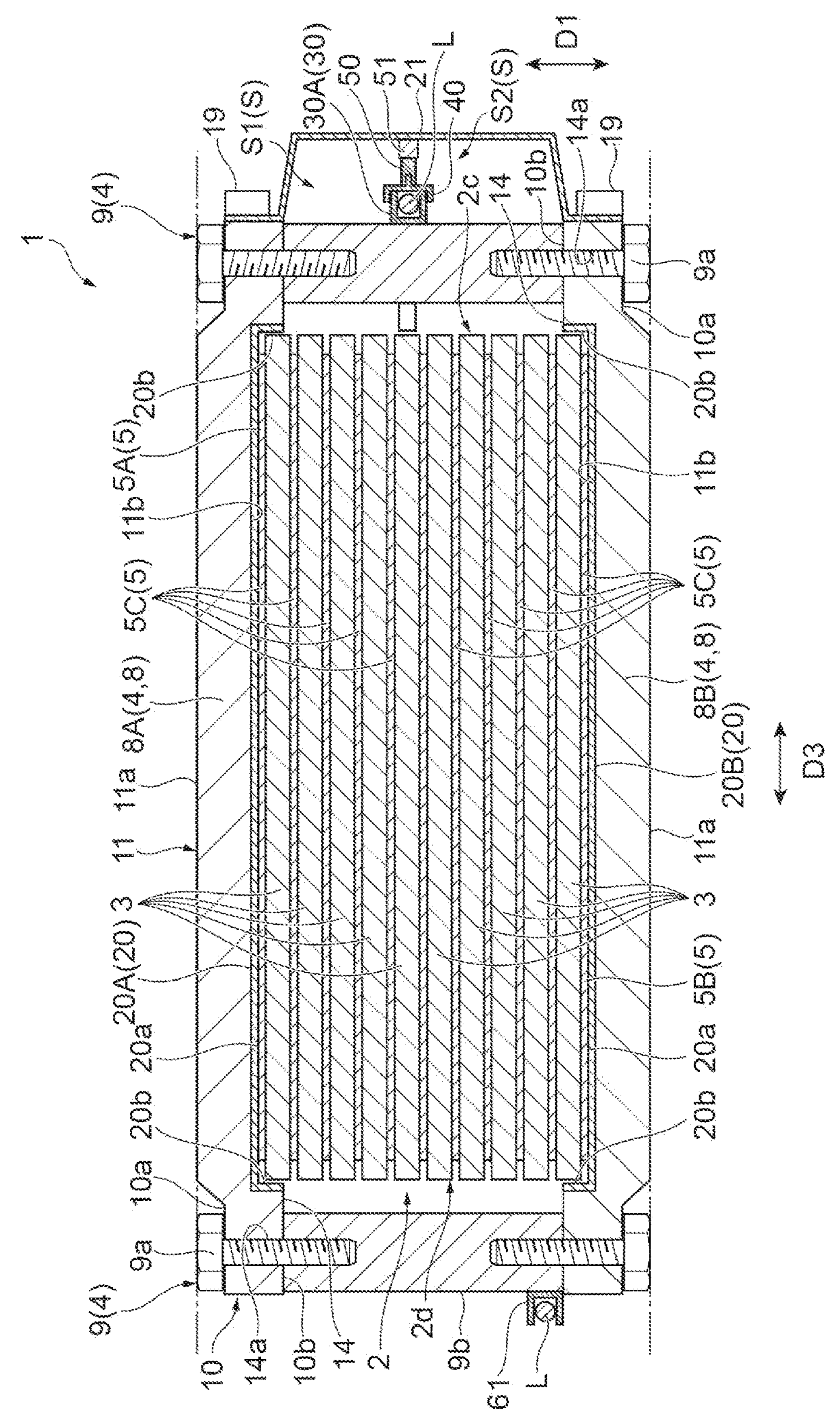
FIG. 2 is a cross-sectional view along line II-II in FIG. 1.

As illustrated in FIG. 2, the plurality of current collectors 5 include a current collector 5A on one end side in the first direction D1, a current collector 5B on the other end side, and a plurality of current collectors 5C interposed between the power storage modules 3. In the present embodiment, the number of current collectors 5C is nine. The current collectors 5C are provided between the power storage modules 3 adjacent to each other in the first direction D1 and electrically connected to the plurality of power storage modules 3.

The current collectors 5A and 5B are disposed such that the plurality of power storage modules 3 and the plurality of current collectors 5C are sandwiched from both sides in the first direction D1. The current collectors 5A and 5B are respectively stacked on the power storage modules 3 positioned at stacking ends in the first direction D1. The current collector 5A is stacked on the power storage module 3 positioned at one stacking end in the first direction D1 and is electrically connected to at least this power storage module 3. The current collector 5B is stacked on the power storage module 3 positioned at the other stacking end in the first direction D1 and is electrically connected to at least this power storage module 3.

A negative electrode terminal 7 (refer to FIG. 3) is connected to the current collector 5A. The negative electrode terminal 7 is drawn out in the second direction D2 orthogonal to the first direction D1 from an edge portion of the current collector 5A. A positive electrode terminal 6 (refer to FIG. 3) is connected to the current collector 5B. The positive electrode terminal 6 is drawn out in the second direction D2 from an edge portion of the current collector 5B. The power storage device 1 is charged and discharged by the positive electrode terminal 6 and the negative electrode terminal 7.

Figure 3:
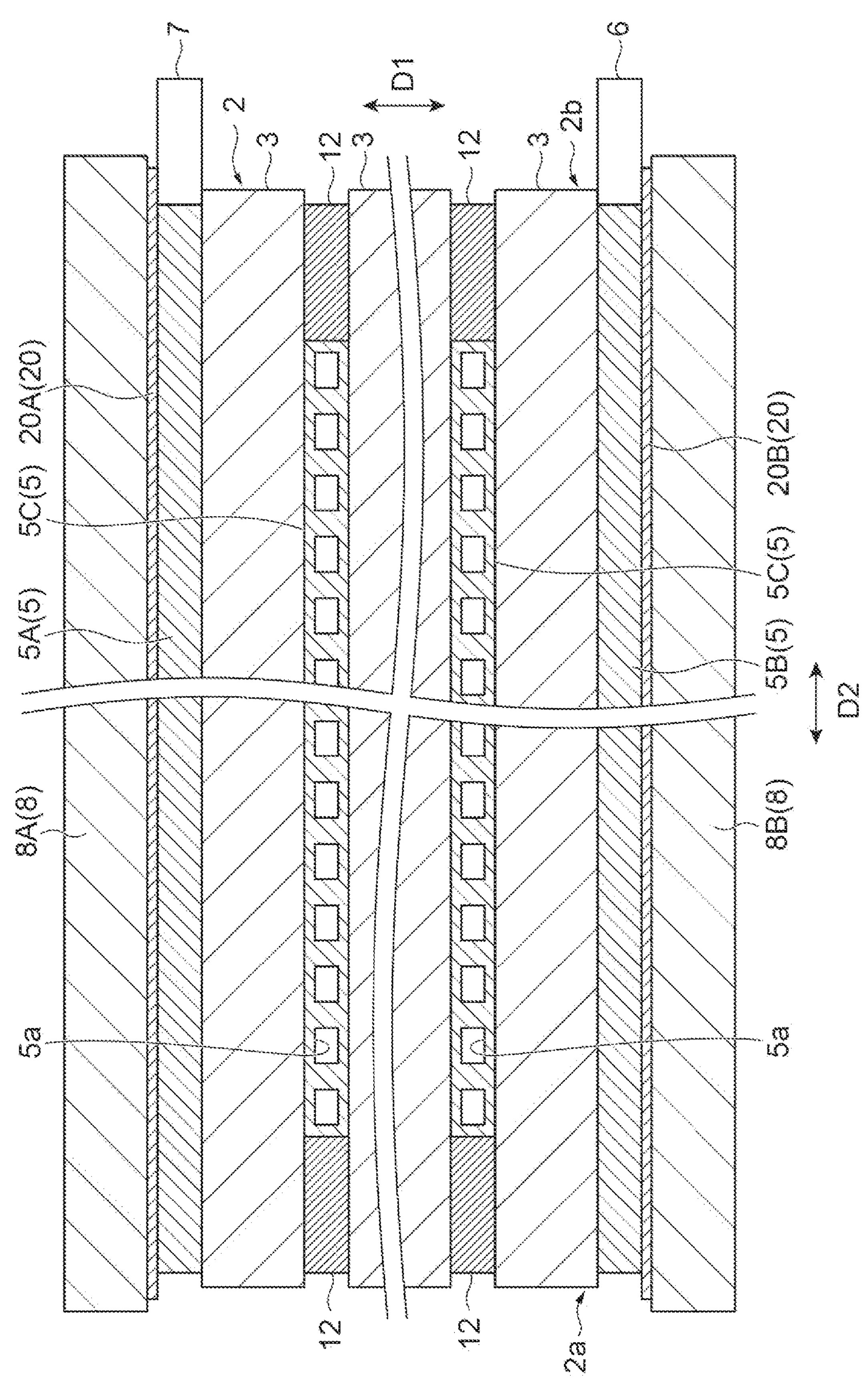
FIG. 3 is a cross-sectional view along line III-III in FIG. 1.

As illustrated in FIG. 3, each of the current collectors 5C is provided with a plurality of flow channels 5*a* through which a cooling fluid flows along the third direction D3 orthogonal to the first direction D1 and the second direction D2. Here, for example, air, water, or the like is used as a cooling fluid. The flow channels 5*a* are penetration holes penetrating the current collectors 5C in the third direction D3. The plurality of flow channels 5*a* are arrayed in the second direction D2. The plurality of current collectors 5C function as heat dissipation plates dissipating heat generated in the power storage modules 3 by flowing the cooling fluid through the flow channels 5*a*. The current collectors 5A and 5B are provided with no flow channels.

The module stacked body 2 has a plurality of detectors 12 disposed on both sides of the current collectors 5C in the second direction D2. The detectors 12 are disposed on both the end portions 2*a* and 2*b* of the module stacked body 2 in the second direction D2. The detectors 12 are provided together with each of the current collectors 5C between the power storage modules 3 adjacent to each other in the first direction D1. For example, each of the detectors 12 is a sensor including a temperature detector (not illustrated) for detecting a temperature of the power storage module 3 and a voltage detector (not illustrated) for detecting a voltage output from the power storage module 3, and monitoring a state of the power storage module 3. For example, the detectors 12 are formed to have the same thicknesses as those of the current collectors 5 using an alkali-proof insulating resin such as polypropylene (PP). The detectors 12 are coupled to both end portions of the current collectors 5C in the second direction D2.

As illustrated in FIG. 2, the duct 21 covers the side surface 2*c*, and a space S in which the cooling fluid flows along the second direction D2 is formed between the duct 21 and the side surface 2*c*. The duct 21 faces inlet ports of the respective flow channels 5*a* (refer to FIG. 3) in the third direction D3 and extends in the second direction D2. As illustrated in FIG. 2, the space S is divided in the first direction D1 by the guide members 30. The space S is divided into two spaces S1 and S2 adjacent to each other in the first direction D1. The space S1 is disposed on the current collector 5A side, and the space S2 is disposed on the current collector 5B side.

As illustrated in FIGS. 1 and 2, a lid 21*c* blocking the space S1 is provided at one end 21*a* (the end portion 2*a* side) of the duct 21. A hole through which the wirings L pass is provided in the lid 21*c*. The space S1 opens at the other end 21*b* (the end portion 2*b* side) of the duct 21. The other end 21*b* constitutes an inlet port for introducing the cooling fluid into the space S1. The cooling fluid flowing in through the inlet port (the other end 21*b*) of the space S1 flows in the space S1 and is guided to the flow channels 5*a* (refer to FIG. 3). The cooling fluid flows through the flow channels 5*a* and flows out from the side surface 2*d* side.

The space S2 opens at the one end 21*a* (the end portion 2*a* side) of the duct 21. The one end 21*a* constitutes an inlet port for introducing the cooling fluid into the space S2. A lid (not illustrated) for blocking the space S2 is provided at the other end 21*b* (the end portion 2*b* side) of the duct 21. The cooling fluid flowing in through the inlet port (one end 21*a*) of the space S2 flows in the space S2 and is guided to the flow channels 5*a* (refer to FIG. 3). The cooling fluid flows through the flow channels 5*a* and flows out from the side surface 2*d* side.

Blowers (not illustrated) are respectively attached to the inlet port of the space S1 and the inlet port of the space S2. The blowers send the cooling fluid to each of the space S1 and the space S2. In the space S1 and the space S2, a direction in which the cooling fluid flows becomes opposite to each other. A cooling capacity of the cooling fluid becomes the highest at the inlet ports of the spaces S1 and S2. Therefore, the end portion 2*a* side and the end portion 2*b* side of the module stacked body 2 can be cooled in a well-balanced manner by reversing positions of the inlet ports of the spaces S1 and S2.

As illustrated in FIGS. 1 and 2, both end portions of the duct 21 in the first direction D1 are fixed to edge portions 10 of restraint plates 8 (which will be described below) using fixing screws 19. The fixing screws 19 are inserted through penetration holes (not illustrated) provided in both the end portions of the duct 21 in the first direction D1 and are screwed to hole portions 10*c* (refer to FIG. 5) provided in the edge portions 10. Accordingly, the duct 21 is fixed to the restraint plates 8.

Figure 4:
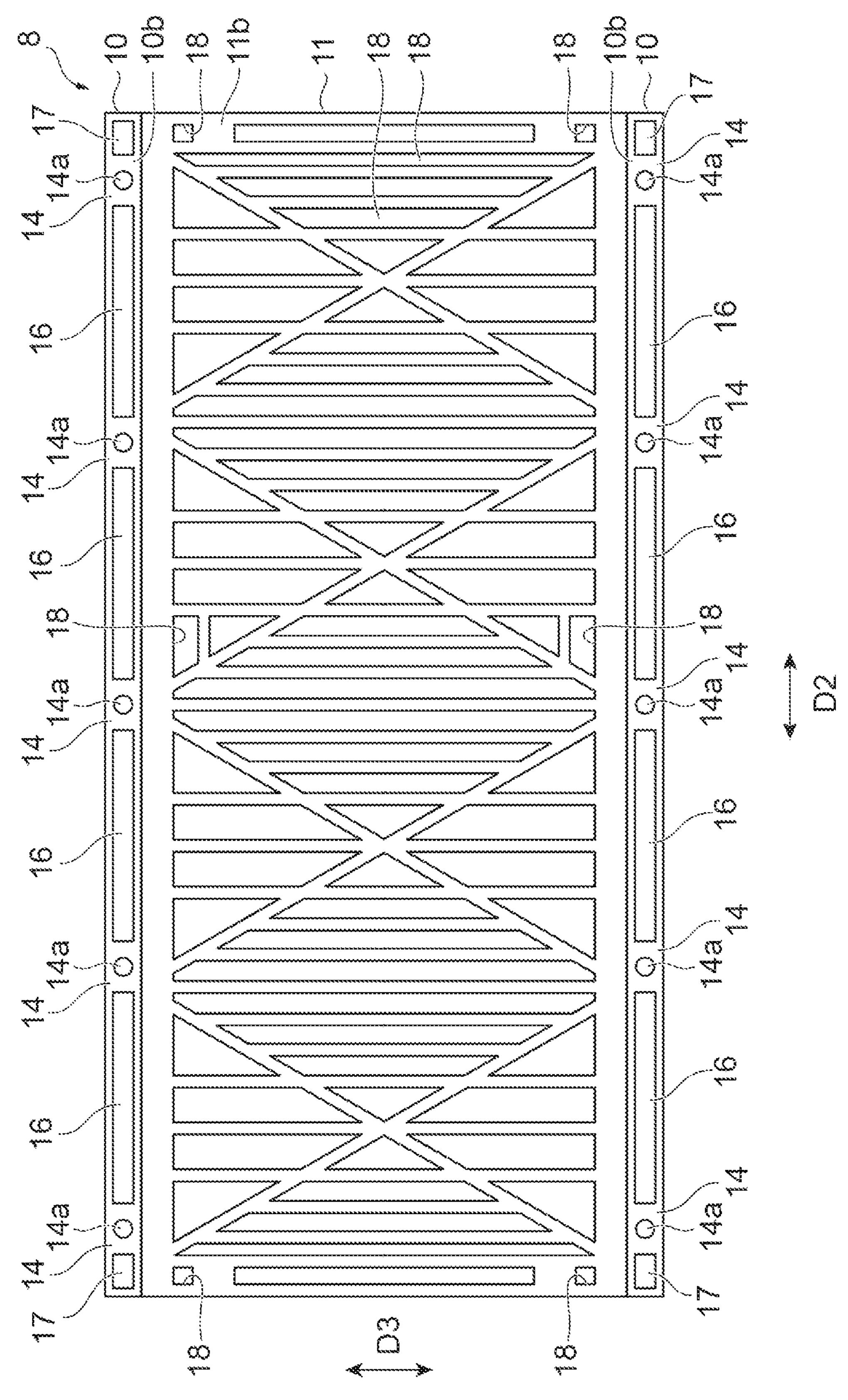
FIG. 4 is a plan view illustrating an inner surface of a restraint plate.

As illustrated in FIGS. 1 to 3, the restraint member 4 includes a pair of restraint plates 8 and a plurality of coupling members 9 coupling the pair of restraint plates 8. The pair of restraint plates 8 include a restraint plate 8A on the current collector 5A side and a restraint plate 8B on the current collector 5B side. FIG. 4 illustrates an inner surface of the restraint plate 8 which comes into contact with the current collector or 5B.

The pair of restraint plates 8 are respectively stacked on both sides of the module stacked body 2 in the first direction D1 such that the module stacked body 2 is sandwiched therebetween. The pair of restraint plates 8 are coupled by the plurality of coupling members 9 and apply a restraint load to the module stacked body 2 in the first direction D1. The plurality of power storage modules 3 and the plurality of current collectors 5 are unitized as the module stacked body 2 by being sandwiched between the pair of restraint plates 8. In the present embodiment, each of the coupling members 9 is constituted of a pair of bolts 9*a* and a bolt collar 9*b*.

The pair of insulating plates 20 are formed of an insulating material. For example, the pair of insulating plates 20 are formed of a resin such as polypropylene (PP). As illustrated in FIGS. 2 and 3, the pair of insulating plates 20 include an insulating plate 20A disposed between the current collector 5A and the restraint plate 8A, and an insulating plate 20B disposed between the current collector 5B and the restraint plate 8B.

The insulating plate 20A is a member for securing insulation properties between the current collector 5A and the restraint plate 8A. The insulating plate 20A comes into contact with the current collector 5A and the restraint plate 8A. The insulating plate 20A is stacked on the module stacked body 2 in the first direction D1. The insulating plate 20A is disposed in a manner of overlapping the entire area of the current collector 5A when viewed in the first direction D1. The restraint plate 8A is stacked on the insulating plate 20A in the first direction D1 and applies a restraint load to at least the insulating plate 20A and the module stacked body 2.

The insulating plate 20B is a member for securing insulation properties between the current collector 5B and the restraint plate 8B. The insulating plate 20B comes into contact with the current collector 5B and the restraint plate 8B. The insulating plate 20B is stacked on the module stacked body 2 in the first direction D1. The insulating plate 20B is disposed in a manner of overlapping the entire area of the current collector 5B when viewed in the first direction D1. The restraint plate 8B is stacked on the insulating plate 20B in the first direction D1 and applies a restraint load to at least the insulating plate 20B and the module stacked body 2.

As illustrated in FIGS. 1 to 4, each of the restraint plates 8 is a rectangular metal plate having a area slightly larger than the areas of the power storage modules 3 and the current collectors 5 when viewed in the first direction D1. A longitudinal direction of the restraint plate 8 coincides with the second direction D2. A transverse direction of the restraint plate 8 coincides with the third direction D3. The restraint plate 8 has a main body portion 11 and a pair of edge portions 10. The main body portion 11 overlaps the module stacked body 2 when viewed in the first direction D1. The pair of edge portions 10 extend in the third direction D3 from the main body portion 11. The pair of edge portions are adjacent to the module stacked body 2 when viewed in the first direction D1 and do not overlap the module stacked body 2. In the present embodiment, the pair of edge portions 10 are respectively provided on both sides of the main body portion 11 in the third direction D3. That is, the main body portion 11 is sandwiched between the pair of edge portions 10 in the third direction D3.

Each of the edge portions 10 has an outer surface 10*a* facing the outside in the first direction D1 (a side opposite to the module stacked body 2 in the first direction D1), and an inner surface 10*b* facing the inside in the first direction D1 (the module stacked body 2 side in the first direction D1). The main body portion 11 has an outer surface 11*a* facing the outside in the first direction D1, and an inner surface 11*b* facing the inside in the first direction D1. The inner surface 11*b* faces the insulating plate 20. The outer surface 10*a* is positioned on the inside of the outer surface 11*a* in the first direction D1. The inner surface 10*b* is positioned on the inside of the inner surface 11*b* in the first direction D1. The inner surface 10*b* faces the guide members 30, 60, and 70 in the first direction D1.

The pair of edge portions 10 are outer edge parts extending in the longitudinal direction of the restraint plate 8 (second direction D2). Each of the edge portions 10 has a plurality of (five in the present embodiment) engagement parts 14. The engagement parts 14 are parts with which the bolts 9*a* are engaged. The plurality of engagement parts 14 are disposed in a manner of being spaced apart from each other in the second direction D2 in each of the edge portions 10. In the present embodiment, the plurality of engagement parts 14 are disposed in the edge portion 10 with an equal interval therebetween in the second direction D2.

The engagement parts 14 are respectively provided with insertion holes 14*a* through which the bolts 9*a* are inserted. The insertion holes 14*a* penetrate the engagement parts 14 in the first direction D1. The insertion holes 14*a* extend in the first direction D1 in a manner of connecting the outer surface 10*a* and the inner surface 10*b* to each other. Head portions of the bolts 9*a* are disposed on the outer surfaces 10*a* of the restraint plates 8A and 8B. Tip portions (screw tips) of shaft portions of the bolts 9*a* protrude from the inner surfaces 10*b* of the restraint plates 8A and 8B and are screwed to both ends of the bolt collars 9*b*. The bolt collars 9*b* are columnar members disposed between the restraint plate 8A and the restraint plate 8B and extend in the first direction D1 in a manner of connecting the restraint plate 8A and the restraint plate 8B to each other. For example, the bolt collars 9*b* are made of aluminum.

Each of the edge portions 10 has a plurality of (four in the present embodiment) recessed portions 16 opening on the inner surface 10*b* and a pair of recessed portions 17. The recessed portions 16 and the recessed portions 17 are groove portions extending in the second direction D2 and having a U-shape in a cross section. Lengths of the recessed portions 16 in the second direction D2 are longer than lengths of the recessed portions 17 in the second direction D2. The pair of restraint plates 8 are disposed such that the recessed portions 16 thereof face each other in the first direction D1 and the recessed portions 17 thereof face each other in the first direction D1.

Figure 8:
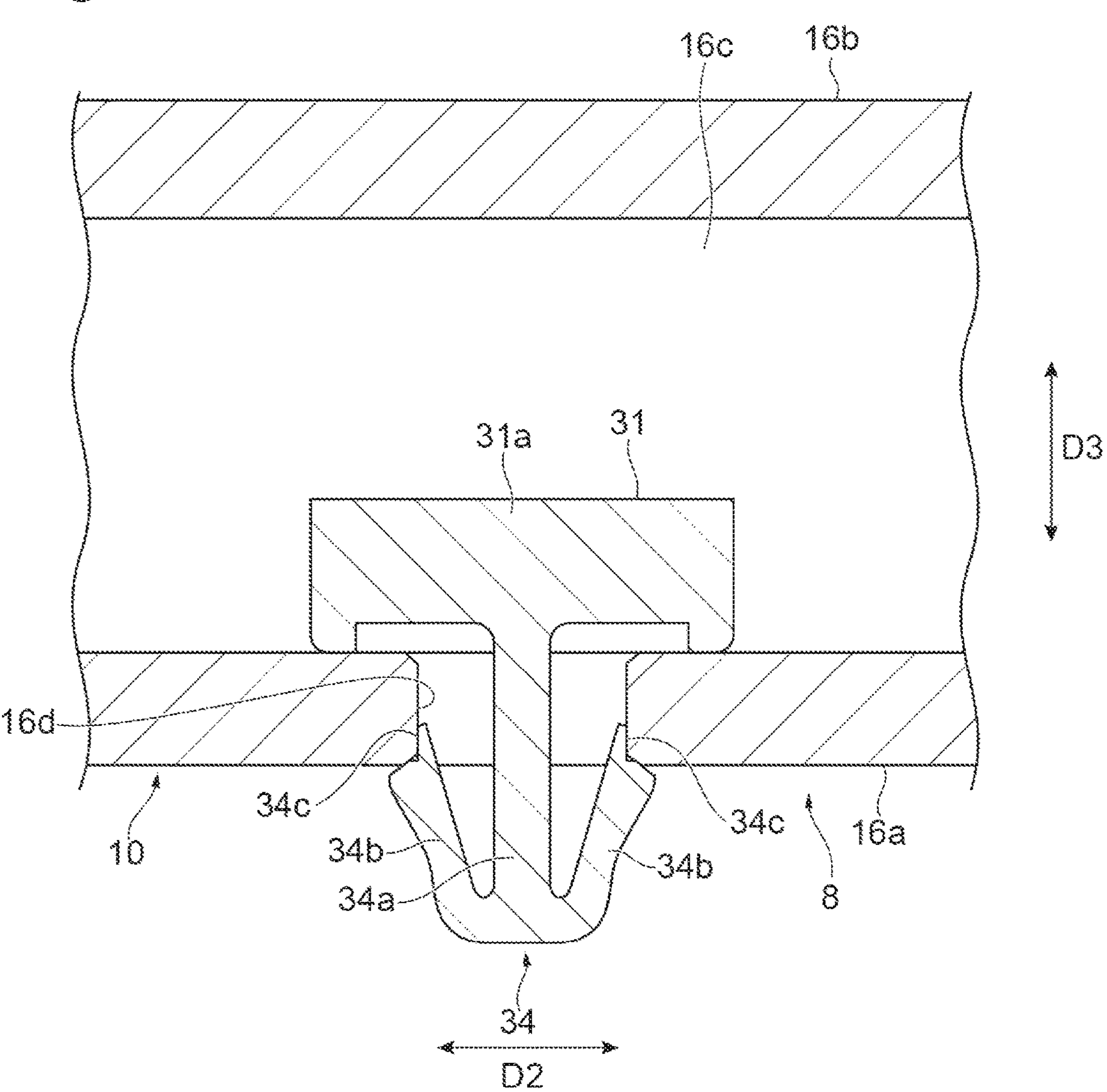
FIG. 8 is a cross-sectional view illustrating a state where a fixing portion is fixed to the restraint plate.
Figure 10:
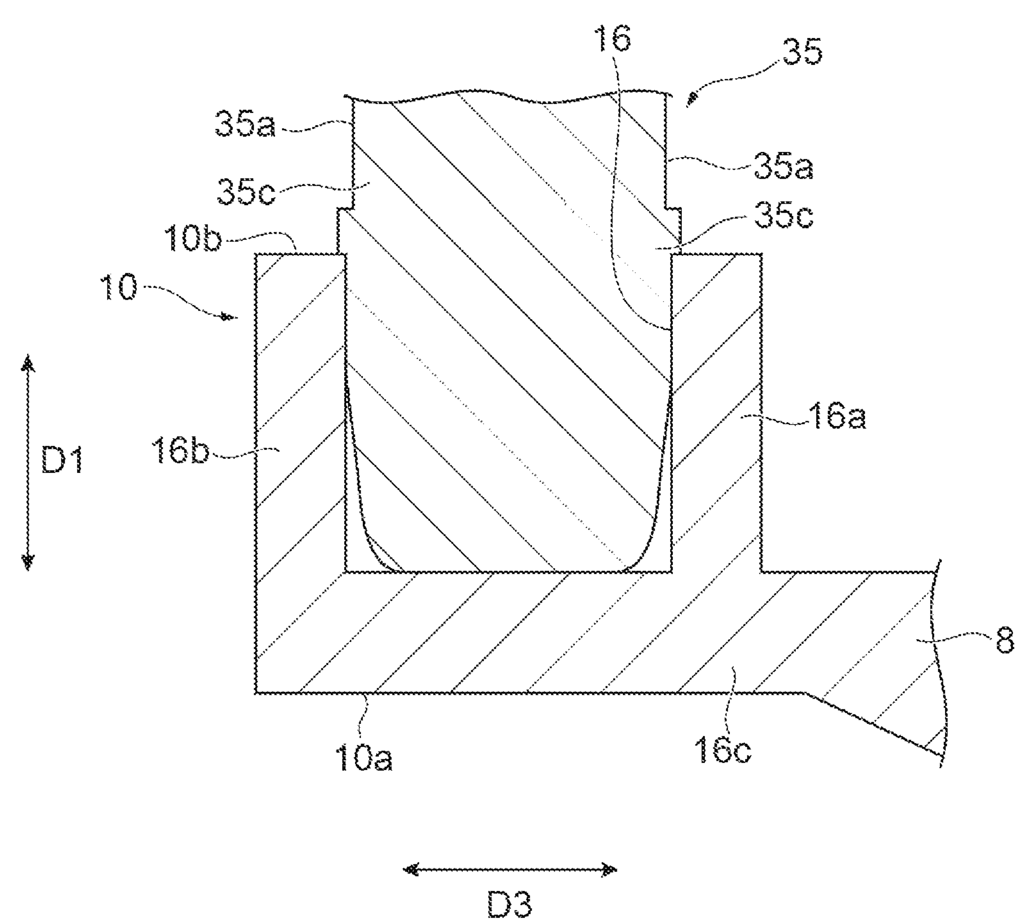
FIG. 10 is a cross-sectional view illustrating a state where the engagement portion is engaged with the restraint plate.

Each of the recessed portions 16 has side walls 16*a* and 16*b* facing each other in the third direction D3, and a bottom wall 16*c* (refer to FIG. 8 or 10). The side wall 16*a* disposed on the inside in the third direction D3 (the module stacked body 2 side) faces the module stacked body 2 in the third direction D3. The plurality of recessed portions 16 are disposed between the engagement parts 14 adjacent to each other in the second direction D2. The plurality of recessed portions 16 are provided at positions corresponding to the current collectors 5C. That is, positional ranges of the plurality of recessed portions 16 in the second direction D2 overlap positional ranges of the current collectors 5C in the second direction D2. When viewed in the first direction D1, the recessed portions 16 extend in the second direction D2 in a manner of being adjacent to the inlet ports or the outlet ports of the plurality of flow channels 5*a* in the third direction D3.

Each of the recessed portions 17 has side walls facing each other in the third direction D3, and a bottom wall. The pair of recessed portions 17 are respectively disposed in the pair of end portions of each of the edge portions 10 in the second direction D2. The plurality of engagement parts 14 and the plurality of recessed portions 16 are disposed between the pair of recessed portions 17. The pair of recessed portions 17 are provided at positions corresponding to the pair of detectors 12 in the second direction D2. That is, the positional range of each of the recessed portions 17 in the second direction D2 overlaps the positional range of the corresponding detector 12 in the second direction D2.

As illustrated in FIG. 4, the main body portion 11 has a plurality of recessed portions 18 opening on the inside in the first direction D1. The plurality of recessed portions 18 have various shapes. The recessed portions 16, the recessed portions 17, and the recessed portions 18 function as thickness-reduced portions (thinned portions) of the restraint plates 8.

The plurality of wirings L illustrated in FIG. 1 are connected to the detectors 12 of the module stacked body 2 (refer to FIG. 3), and a signal output terminal of a control device (not illustrated) which is an external device. For example, the control device is an electronic control unit (ECU). For example, the control device is disposed on the end portion 2*a*. A detection signal of the detectors 12 is transmitted to the control device through the plurality of wirings L. Since the detectors 12 are disposed in the module stacked body 2, it can be said that the plurality of wirings L are connected to the module stacked body 2.

The plurality of wirings L are connected to at least one of the voltage detector and the temperature detector (for example, a thermistor) included in each of the detectors 12. In the present embodiment, the detector 12 disposed in the end portion 2*b* includes the voltage detector, and the detector 12 disposed in the end portion 2*a* includes the temperature detector. Therefore, the plurality of wirings L connected to the voltage detector are drawn out from the end portion 2*b* to the end portion 2*a* through the side surface 2*c* or the side surface 2*d*. The plurality of wirings L are bundled together on the side surface 2*c* or the side surface 2*d*. In FIGS. 2, 5, 11, and 15, a state where the plurality of wirings L are bundled is illustrated as one wiring L.

Figure 5:
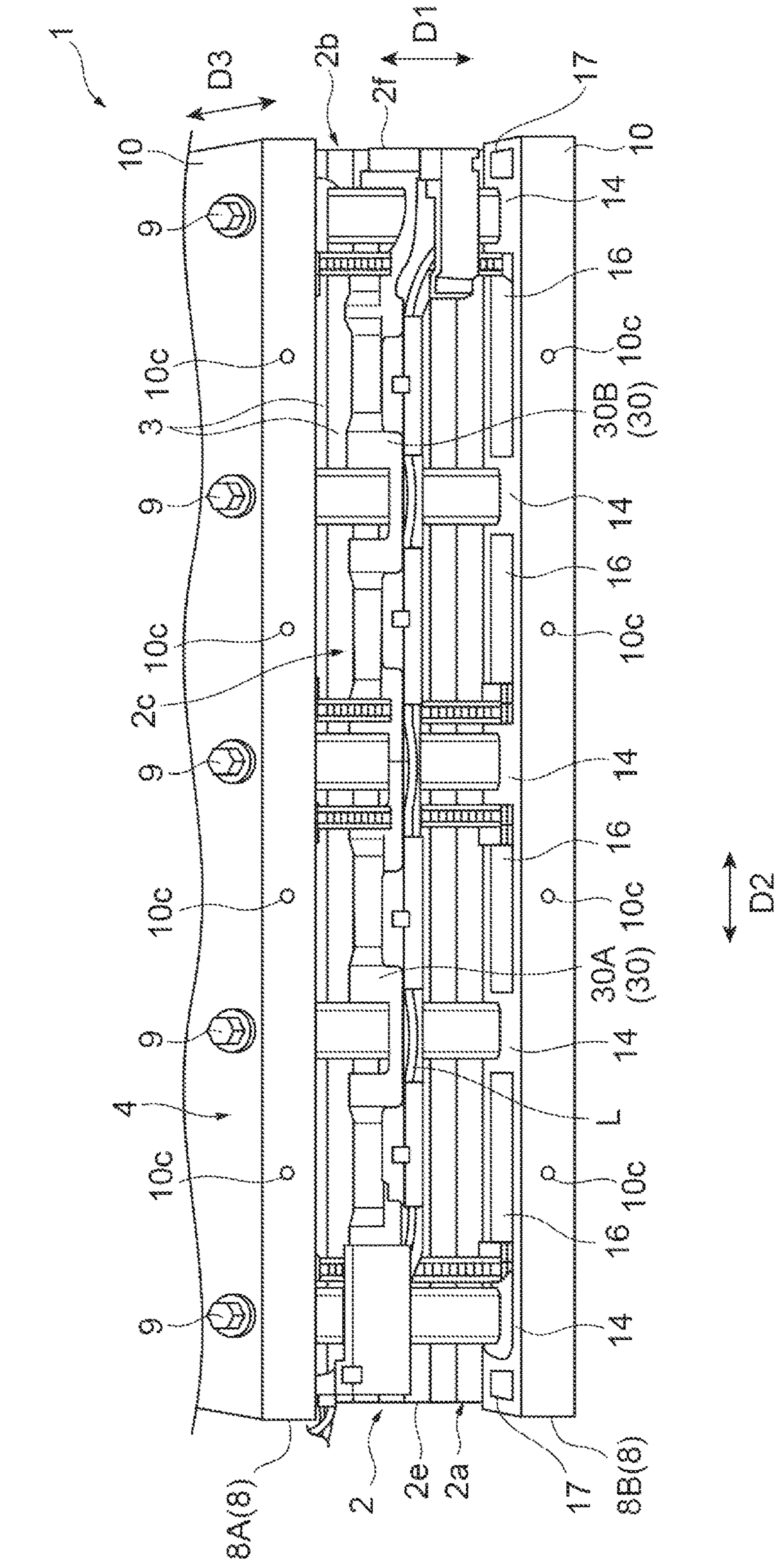
FIG. 5 is a perspective view of the power storage device in FIG. 1.
Figure 6:
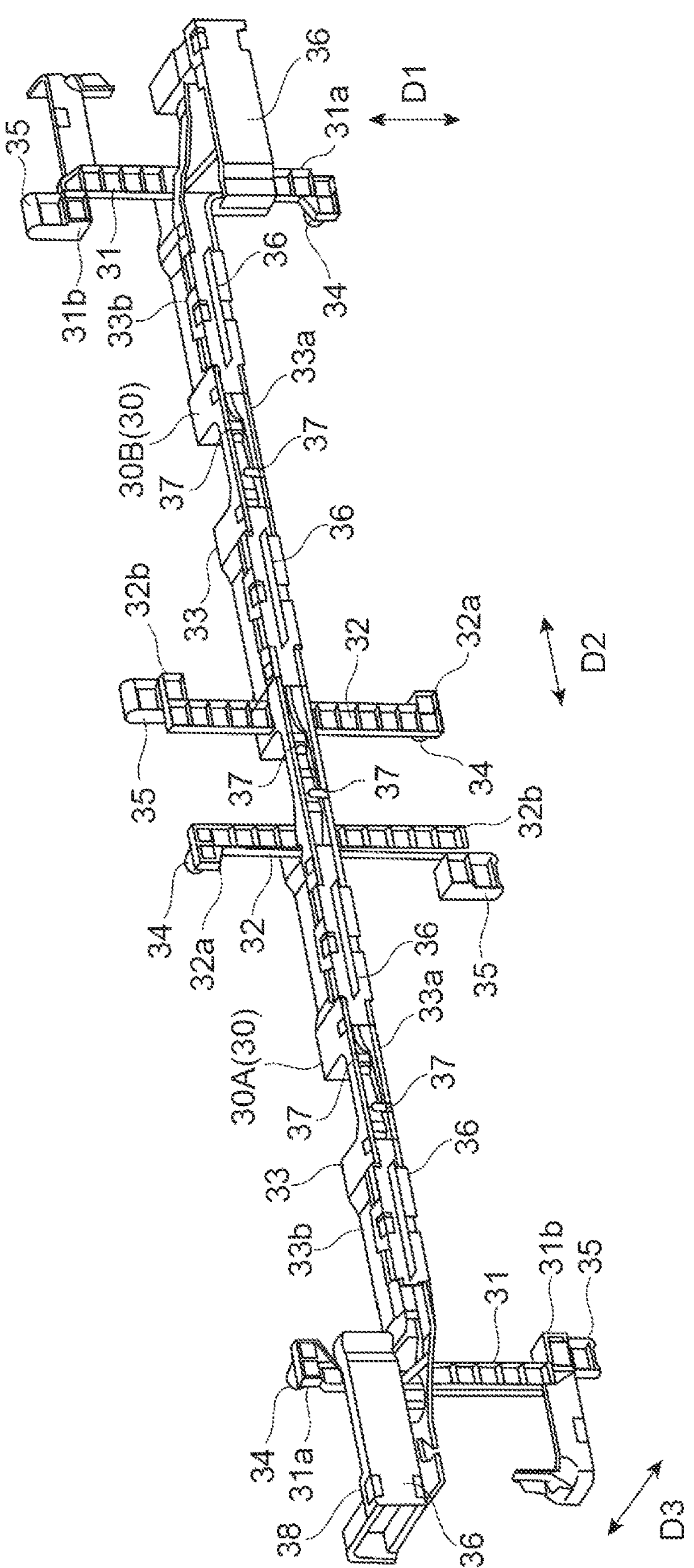
FIG. 6 is a perspective view of guide members.
Figure 7:
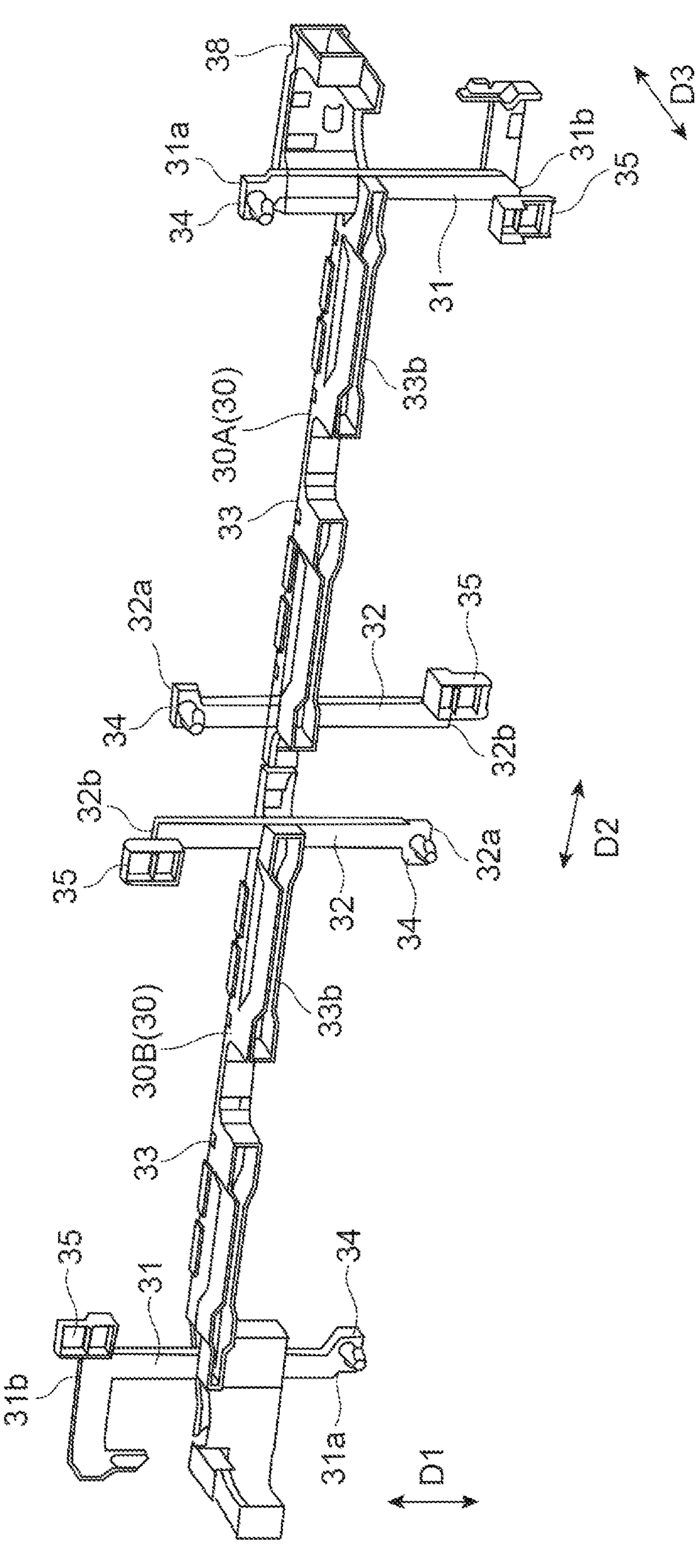
FIG. 7 is another perspective view of the guide members.

As illustrated in FIG. 5, the pair of guide members 30 are members attached to parts on the side surface 2*c* and guiding the wirings L along the side surface 2*c* of the module stacked body 2. The pair of guide members 30 are coupled to the restraint plates 8A and 8B and dispose the wirings L on the side surface 2*c*. As illustrated in FIGS. 6 and 7, each of the guide members 30 has a first extending portion 31, a second extending portion 32, a wiring guide portion 33, a pair of fixing portions 34, a pair of engagement portions 35, a plurality of (three in the present embodiment) cover portions 36, a plurality of (three in the present embodiment) projecting portions 37, and a wiring bending portion 38. For example, the guide members 30 are made of an insulating resin such as polypropylene (PP). For example, the portions of each of the guide members 30 are integrally formed as one member by injection molding of a resin. For example, linear expansion coefficients of the guide members 30 are larger than linear expansion coefficients of the restraint plates 8 and the bolt collars 9*b*.

The first extending portion 31 extends in the first direction D1. The second extending portion 32 is spaced apart from the first extending portion 31 in the second direction D2 and extends in the first direction D1. The wiring guide portion 33 is connected to each of the first extending portion 31 and the second extending portion 32 and extends in the second direction D2. The wiring guide portion 33 is spaced apart in the first direction D1 from each of both end portions 31*a* and 31*b* of the first extending portion 31 and is spaced apart in the first direction D1 from each of both end portions 32*a* and 32*b* of the second extending portion 32. In the present embodiment, the wiring guide portion 33 is connected to substantially the center of the first extending portion 31 in the first direction D1 and is connected to substantially the center of the second extending portion 32 in the first direction D1. Each of the first extending portion 31, the second extending portion 32, and the wiring guide portion 33 has an H-shape in its entirety.

The wiring guide portion 33 includes a groove portion 33*a* and a leg portion 33*b*. The groove portion 33*a* is a member having a semi-cylindrical shape cut out in half in a circumferential direction or a U-shape in a cross section and constituted to be able to accommodate the wirings L therein. The groove portion 33*a* is disposed on the side surface 2*c* such that the cutout part in the circumferential direction is positioned on a side opposite to the side surface 2*c*. The leg portion 33*b* extends from the groove portion 33*a* toward the side surface 2*c* and holds the groove portion 33*a* at a position spaced apart from the side surface 2*c*. The leg portion 33*b* is not provided at a position interfering with the bolt collar 9*b*. A height of the leg portion 33*b* from the side surface 2*c* is substantially equivalent to a height of the bolt collar 9*b* from the side surface 2*c*. For this reason, the groove portion 33*a* extends in the second direction D2 at a substantially constant height position from the side surface 2*c*.

The pair of guide members 30 are provided side by side in the second direction D2. A guide member 30A is provided on the end portion 2*a* side, and a guide member 30B is provided on the end portion 2*b* side. The guide members 30A and 30B have shapes which are the same as each other. The guide members 30A and 30B are disposed such that the second extending portions 32 thereof are adjacent to each other and the wiring guide portions 33 thereof are connected to each other in the second direction D2. The pair of guide members 30 guide the wirings L, which have been drawn out from the detectors 12 in the end portion 2*b* to the side surface 2*c*, to the end portion 2*a* along the side surface 2*c* by each of the wiring guide portions 33. The wirings L drawn out from the detectors 12 in the end portion 2*a* to the side surface 2*c* via the wiring bending portion 38 are guided to the end portion 2*b* along the side surface 2*c* by the wiring guide portion 33 of the guide member 30A. The wiring guide portion 33 extends in the second direction D2 and guides the wirings L toward the side surface 2*e*. The wiring bending portion 38 is provided in an end portion of the wiring guide portion 33 on the side surface 2*e* side and bends the wirings from the first side surface toward the second side surface. The wiring bending portion 38 has an L-shape when viewed in the first direction D1.

As illustrated in FIG. 2, a pressurization member 50 and a seal member 51 are sandwiched between the wiring guide portion 33 and the duct 21. The pressurization member 50 is a member for pressurizing the seal member 51 and is mounted on the wiring guide portion 33. For example, the pressurization member 50 is made of an insulating resin such as polypropylene (PP). For example, the pressurization member is formed by injection molding of a resin. For example, the seal member 51 is an EPT seal made of an insulating resin. Together with the pressurization member 50 and the seal member 51, the wiring guide portion 33 divides the space S in the first direction D1. The wiring guide portion 33 divides the space S in the first direction D1 by the leg portion 33*b* protruding in the third direction D3 toward the side surface 2*c*.

As illustrated in FIGS. 6 and 7, the pair of fixing portions 34 are provided in a manner of being spaced apart from each other in the second direction D2. One fixing portion 34 is provided in the end portion 31*a* of the first extending portion 31. The other fixing portion 34 is provided in the end portion 32*a* of the second extending portion 32. In the guide member 30A, each of the pair of fixing portions 34 is fixed to the restraint plate 8A. In the guide member 30B, each of the pair of fixing portions 34 is fixed to the restraint plate 8B.

The pair of engagement portions 35 are provided in a manner of being spaced apart from each other in the second direction D2. One engagement portion 35 is provided in the end portion 31*b* of the first extending portion 31. The other engagement portion 35 is provided in the end portion 32*b* of the second extending portion 32. In the guide member 30A, the pair of engagement portions 35 are provided in a manner of protruding from the end portions 31*b* and 32*b* to the restraint plate 8B side in the first direction and are engaged with the restraint plate 8B so as to be movable in the first direction D1 and the second direction D2. In the guide member 30B, the pair of engagement portions 35 are provided in a manner of protruding from the end portions 31*b* and 32*b* to the restraint plate 8A side in the first direction D1 and are each engaged with the restraint plate 8A.

As illustrated in FIG. 8, the recessed portion 16 of the restraint plate 8 is provided with a penetration hole 16*d* penetrating the side wall 16*a* in the third direction D3. The fixing portion 34 is inserted through the penetration hole 16*d* from the inside of the recessed portion 16 and is fixed to the restraint plate 8. The fixing portion 34 has a shaft portion 34*a* and a pair of claw portions 34*b*. The shaft portion 34*a* extends in the third direction D3. The pair of claw portions 34*b* are provided on both sides of the shaft portion 34*a* in the second direction D2 such that the shaft portion 34*a* is sandwiched therebetween in the second direction D2. Each of tips of the claw portions 34*b* is provided with a stepped portion 34*c*.

The pair of claw portions 34*b* are attached to a tip of the shaft portion 34*a* such that they can be opened and closed in the second direction D2 due to elastic deformation. The fixing portion 34 is fixed to the restraint plate 8 when the pair of claw portions 34*b* are inserted through the penetration hole 16*d* from the inside of the recessed portion 16 in a state of being closed in the second direction D2 (the tips of the claw portions 34*b* become closer to the shaft portion 34*a* in the second direction D2), then the pair of claw portions 34*b* open in the second direction D2 (the tips of the claw portions 34*b* are separated from the shaft portion 34*a* in the second direction D2), and the stepped portions 34*c* are in a state of being in contact with and caught by the end portion of the penetration hole 16*d* (a corner portion formed by the inner side surface of the penetration hole 16*d* and the outside surface of the recessed portion 16).

A length of the penetration hole 16*d* in the second direction D2 is longer than a combined length of the shaft portion 34*a* and the pair of stepped portions 34*c* in the second direction D2. For this reason, the fixing portion 34 is fixed to the restraint plate 8 so as to be movable in the second direction D2 within the range of the penetration hole 16*d*. The penetration hole 16*d* may penetrate the bottom wall 16*c* of the recessed portion 16 in the first direction D1 and the shaft portion 34*a* may extend in the first direction D1. In this case as well, the fixing portion 34 can be fixed to the penetration hole 16*d*.

Figure 9:
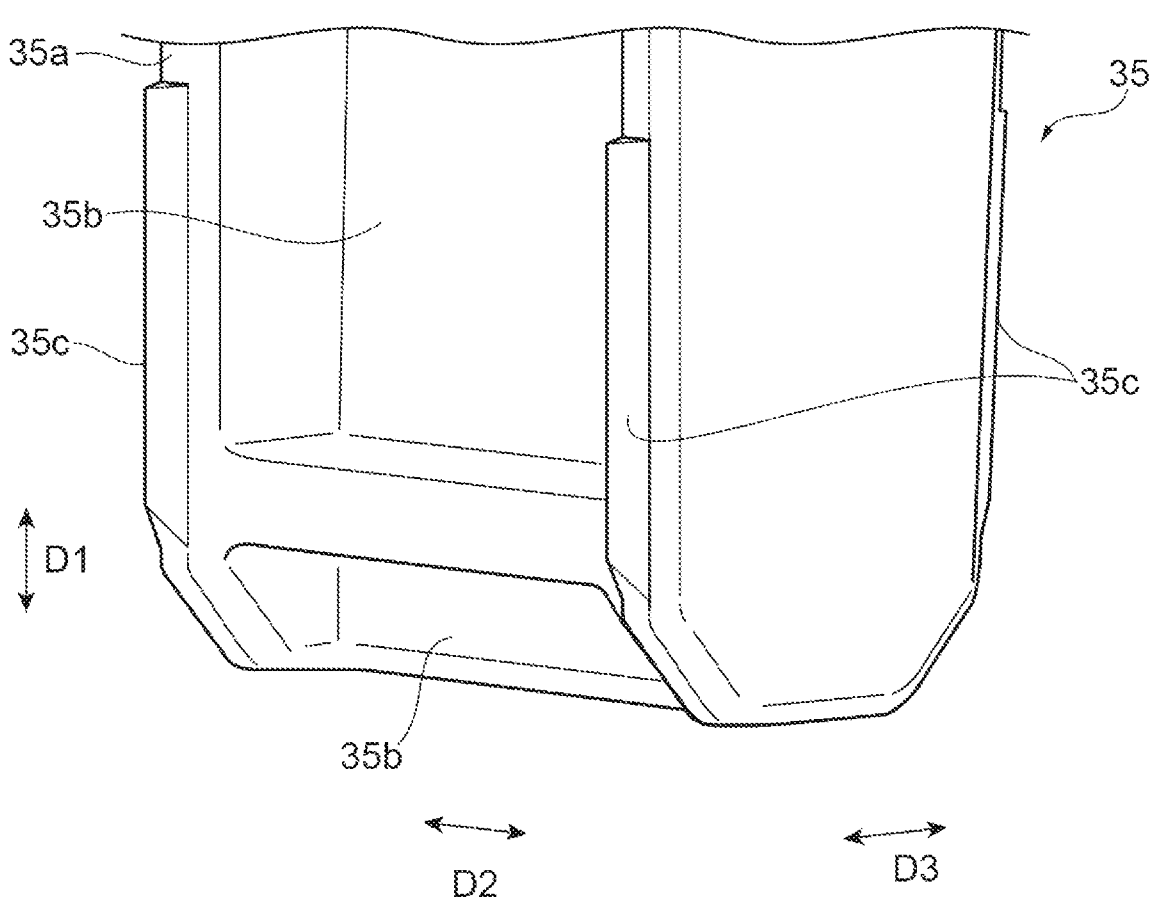
FIG. 9 is a perspective view of an engagement portion.

As illustrated in FIGS. 9 and 10, the engagement portion 35 has a pair of side surfaces 35*a* facing sides opposite to each other in the third direction D3 and respectively facing the side walls 16*a* and 16*b* of the recessed portion 16. A plurality of sunken portions 35*b* penetrating the engagement portion 35 in the third direction D3 are formed in the engagement portion 35. Both end portions of each of the side surfaces in the third direction D3 are respectively provided with projecting portions 35*c*. The projecting portions 35*c* protrude in the third direction D3 and extend in the first direction D1.

The engagement portion 35 is press-fitted into the recessed portion 16 of the restraint plate 8. A tip portion of the engagement portion 35 has a shape tapered in the third direction D3. That is, the tip portion of the engagement portion 35 is not provided with no projecting portion 35*c*, and a length between the pair of side surfaces 35*a* becomes shorter toward a tip of the engagement portion 35. For this reason, the engagement portion 35 can be easily inserted into the recessed portion 16.

When the engagement portion 35 is press-fitted into the recessed portion 16, the projecting portions 35*c* receive stress in the third direction D3 from the side walls 16*a* and 16*b*. Accordingly, as illustrated in FIG. apex portions of the projecting portions 35*c* are plastically deformed in a manner of being squashed. As a result, the engagement portion 35 is engaged with the recessed portion 16. Since the recessed portion 16 extends in the second direction D2, when the power storage modules 3 expand and contract, the engagement portion 35 can slide in the second direction D2 inside the recessed portion 16 while being coupled to the restraint plate 8.

As illustrated in FIG. 6, the plurality of cover portions 36 cover the cutout parts of the groove portion 33*a* of the wiring guide portion 33 in the circumferential direction. The plurality of cover portions 36 are disposed in a manner of being spaced apart from each other. The plurality of cover portions 36 are attached to the wiring guide portion 33 such that they can be opened and closed. For example, the cover portions 36 are formed integrally with the wiring guide portion 33. The plurality of projecting portions 37 are provided in the cutout parts of the groove portion 33*a* and curb detachment of the wirings L from the groove portion 33*a*.

Figure 11:
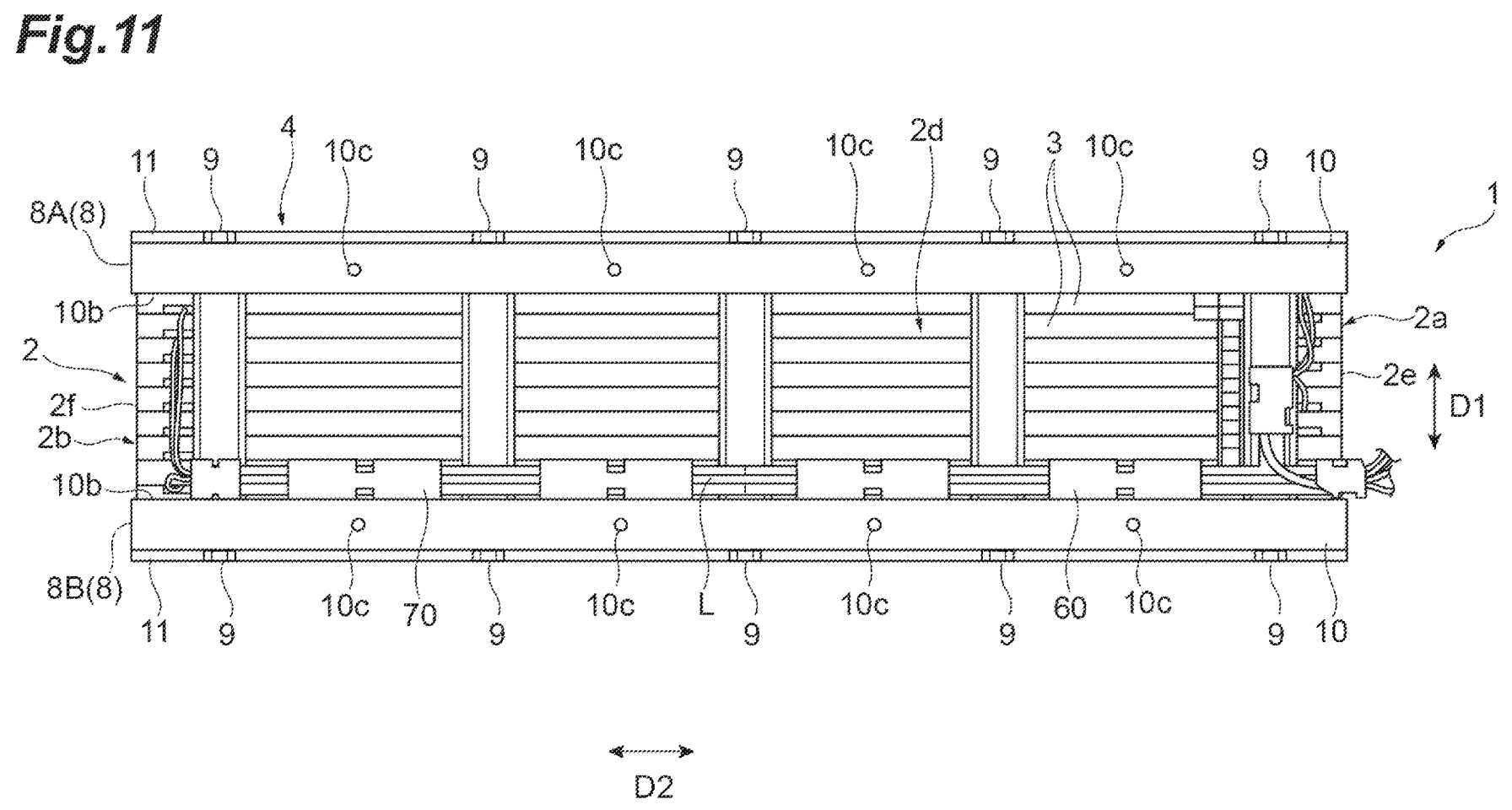

As illustrated in FIG. 11, the guide members 60 and 70 are members attached to parts on the side surface 2*d* and guiding the wirings L along the side surface 2*d* of the module stacked body 2. The guide members 60 and 70 are provided side by side in the second direction D2. The guide member 60 is provided on the end portion 2*a* side, and the guide member 70 is provided on the end portion 2*b* side. For example, the guide members 60 and 70 are made of an insulating resin such as polypropylene (PP). For example, the portions of each of the guide members 60 and 70 are integrally formed as one member by injection molding of a resin. For example, linear expansion coefficients of the guide members 60 and 70 are larger than the linear expansion coefficients of the restraint plates 8 and the bolt collars 9*b*. For example, the guide members 60 and 70 are formed of a material which is the same as that of the guide members 30.

Figure 12:
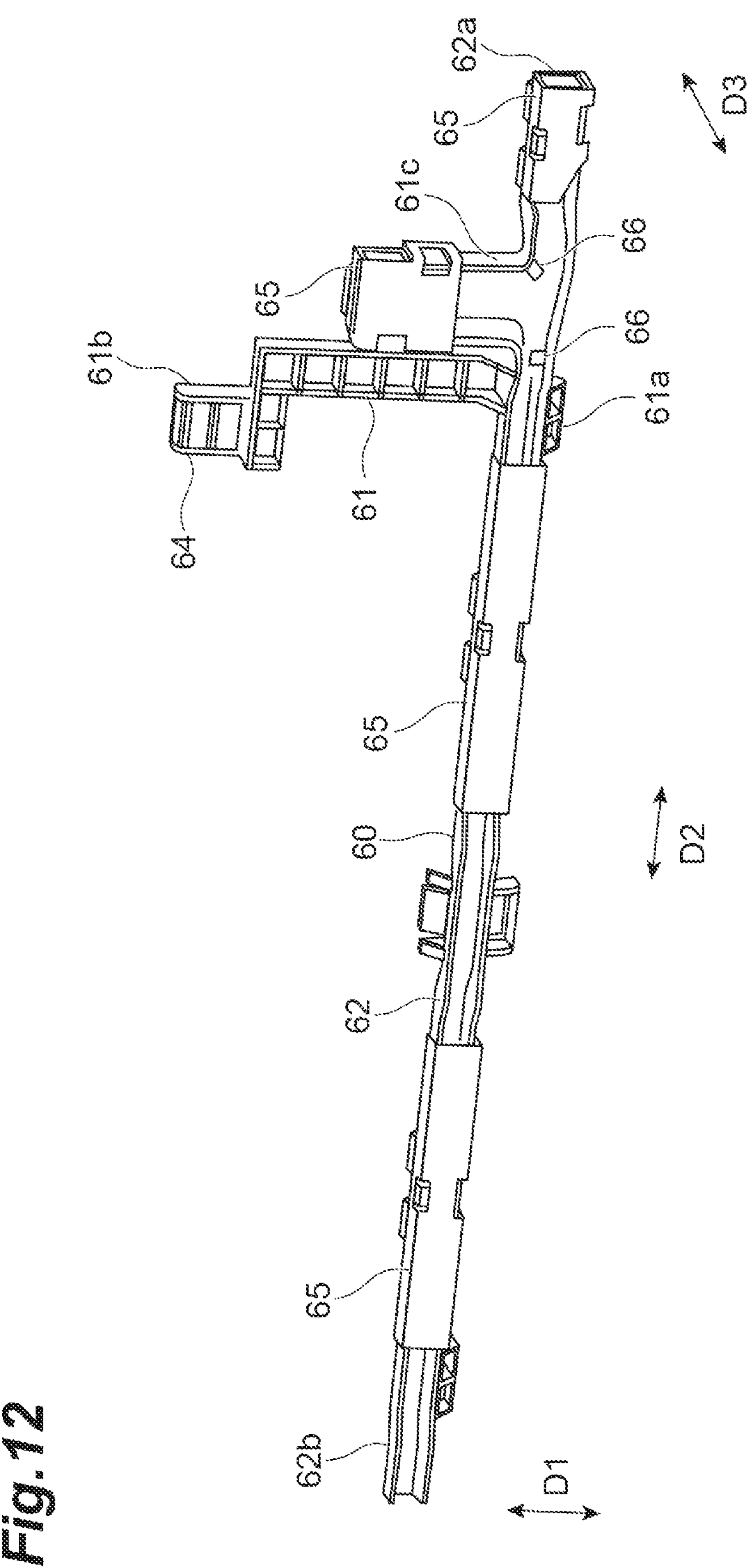
FIG. 12 is a perspective view of a guide member.
Figure 13:
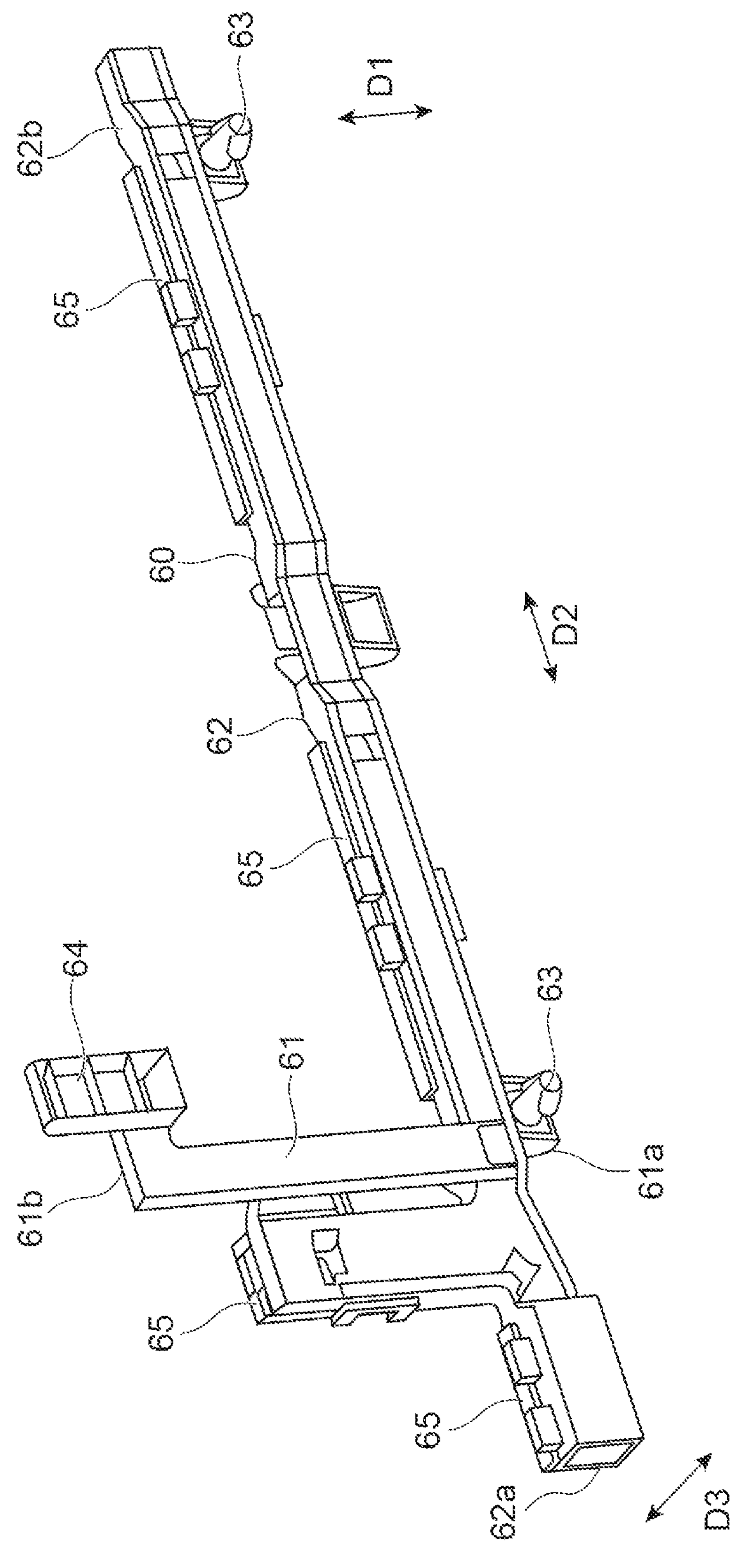
FIG. 13 is another perspective view of the guide member.

As illustrated in FIGS. 12 and 13, the guide member 60 has a first extending portion 61, a wiring guide portion 62, a pair of fixing portions 63, an engagement portion 64, a plurality of (four in the present embodiment) cover portions 65, and a plurality of (two in the present embodiment) projecting portions 66. The first extending portion 61 extends in the first direction D1. The first extending portion 61 includes a groove portion 61*c*. The groove portion 61*c* is a member having a semi-cylindrical shape cut out in half in the circumferential direction or a U-shape in a cross section and constituted to be able to accommodate the wirings L therein. The groove portion 61*c* is disposed on the side surface 2*d* such that the cutout part in the circumferential direction is positioned on a side opposite to the side surface 2*d*.

The wiring guide portion 62 is connected to the first extending portion 61 and extends in the second direction D2. The wiring guide portion 62 is connected to an end portion 61*a* of the first extending portion 61. The wiring guide portion 62 is disposed along the inner surface 10*b* of the edge portion 10 of the restraint plate 8B. The wiring guide portion 62 is disposed on the inner surface 10*b* of the edge portion 10 of the restraint plate 8B and extends in the second direction D2 along the edge portion 10. The wiring guide portion 62 may come into contact with or may not come into contact with the inner surface 10*b*. The wiring guide portion 62 is a groove member having a semi-cylindrical shape cut out in half in the circumferential direction or a U-shape in a cross section and constituted to be able to accommodate the wirings L therein. The wiring guide portion 62 is disposed on the side surface 2*d* such that the cutout part in the circumferential direction is positioned on a side opposite to the side surface 2*d*.

The wiring guide portion 62 has both end portions 62*a* and 62*b* in the second direction D2. The end portion 62*a* is disposed on the end portion 2*a* side. The end portion 62*a* is provided at a place close to the side surface 2*e* than the end portion 62*b*. The end portion 62*b* is disposed on the end portion 2*b* side and is adjacent to the guide member 70. The end portion 61*a* is connected to a part between the end portion 62*a* and the end portion 62*b*. The first extending portion 61 and the wiring guide portion 62 have a T-shape in their entirety. The end portion 61*a* may be connected to the end portion 62*a*. In this case, the first extending portion 61 and the wiring guide portion 62 have an L-shape in their entirety. The end portion 62*a* functions as a wiring bundling portion bundling the plurality of wirings L together on the side surface 2*d*.

The pair of fixing portions 63 are provided in a manner of being spaced apart from each other in the second direction D2. One fixing portion 63 is provided in the end portion 61*a* of the first extending portion 61. The other fixing portion 63 is provided in the wiring guide portion 62 in a manner of being spaced apart from the end portion 61*a* in the second direction D2. In the present embodiment, the other fixing portion 63 is provided in the end portion 62*b*. Each of the pair of fixing portions 63 is fixed to the restraint plate 8B. The fixing portion 63 has a structure equivalent to that of the fixing portion 34. Similar to the fixing portion 34, the fixing portion 63 is fixed to the penetration hole 16*d* provided in the side wall 16*a* of the recessed portion 16. Similar to the fixing portion 34, the fixing portion 63 is fixed to the restraint plate 8B so as to be movable in the second direction D2 within the range of the penetration hole 16*d*.

The engagement portion 64 is provided in an end portion 61*b* of the first extending portion 61. The engagement portion 64 is provided in a manner of protruding from the end portion 61*b* to the restraint plate 8A side in the first direction D1 and is engaged with the restraint plate 8A so as to be movable in the first direction D1 and the second direction D2. The engagement portion 64 has a structure equivalent to that of the engagement portion 35. Similar to the engagement portion 35, the engagement portion 64 is engaged with the recessed portion 16.

The plurality of cover portions 65 cover the cutout part in the groove portion 61*c* of the first extending portion 61 and the cutout part of the wiring guide portion 62. The plurality of cover portions 65 are disposed in a manner of being spaced apart from each other. The plurality of cover portions 65 are attached to the first extending portion 61 and the wiring guide portion 62 such that they can be opened and closed. For example, the plurality of cover portions 65 are formed integrally with the first extending portion 61 and the wiring guide portion 62. The projecting portions 66 are provided in the cutout parts of the wiring guide portion 62 and curb detachment of the wirings L from the wiring guide portion 62.

As illustrated in FIG. 11, the guide member 70 extends in the second direction D2. The guide member 70 is provided in a manner of being connected to the end portion 62*b* of the second extending portion of the guide member 60 (refer to FIG. 12). The guide member 70 is disposed along the inner surface 10*b* of the edge portion 10 of the restraint plate 8B together with the wiring guide portion 62. The guide member is disposed on the inner surface 10*b* of the edge portion 10 of the restraint plate 8B and extends in the second direction D2 along the edge portion 10. The guide member 70 has a pair of fixing portions (not illustrated) which are spaced apart from each other in the second direction D2 and fixed to the restraint plate 8B. The fixing portion of the guide member 70 also has a structure equivalent to that of the fixing portion 34. Similar to the fixing portion 34, the fixing portion is fixed to the penetration hole 16*d* provided in the side wall 16*a* of the recessed portion 16.

The wirings L drawn out from the detectors 12 in the end portion 2*b* to the side surface 2*d* are guided to the end portion 2*a* along the side surface 2*d* by the guide member 70 and the wiring guide portion 62 of the guide member 60. The wirings L drawn out from the detectors 12 in the end portion 2*a* to the side surface 2*d* are guided to the end portion 2*a* along the side surface 2*d* by the first extending portion 61 and the wiring guide portion 62 of the guide member 60.

Operation and Effects

In the power storage device 1, the first extending portions 31 of the guide members 30 extend in the first direction D1. The end portions 31*a* of the first extending portions 31 are fixed to one restraint plate 8 by the fixing portions 34, and the end portions 31*b* of the first extending portions 31 are engaged with the other restraint plate 8 by the engagement portions 35. Thus, the guide members 30 can reliably guide the wirings L along the side surface 2*c* of the module stacked body 2 without being detached from each of the restraint plates 8.

The wiring guide portions 33 of the guide members 30 extend in the second direction D2. Thus, the wirings L can be guided in the second direction D2. The second extending portions 32 of the guide members 30 extend in the first direction D1. The end portions 31*a* of the first extending portions 31 and the end portions 32*a* of the second extending portions 32 are fixed to one restraint plate 8 by the fixing portions 34. The end portions 31*b* of the first extending portions 31 and the end portions 32*b* of the second extending portions 32 are engaged with the other restraint plate 8 by the engagement portions 35. Thus, the guide members 30 are less likely to be detached from each of the restraint plates 8.

The fixing portions 34 can move in the second direction D2, and the engagement portions 35 can move in the first direction D1 and the second direction D2. Thus, even when the module stacked body 2 and the guide members 30 expand and contract in the first direction D1 and the second direction D2 with linear expansion coefficients different from each other, damage to the guide members 30 is curbed.

The space S formed between the duct 21 and the side surface 2*c* is divided into the two spaces S1 and S2 in the first direction D1 by the wiring guide portions 33 of the guide members 30 and the pressurization member 50 and the seal member 51. For this reason, a blower can be provided for each of the divided spaces S1 and S2. Thus, it is possible to enhance the cooling effect.

The wiring guide portion 33 is spaced apart from each of the end portion 31*a* and the end portion 31*b* in the first direction D1 and is spaced apart from each of the end portion 32*a* and the end portion 32*b* in the first direction D1. For this reason, sizes of the divided spaces S1 and S2 are unlikely to be biased. Thus, it is easy to enhance the cooling effect.

On the side surface 2*c*, the two guide members 30 are provided side by side in the second direction D2. For this reason, the length of each of the guide members 30 in the second direction D2 can be shortened. Thus, when the module stacked body 2 and the guide members 30 expand and contract in the second direction D2 with linear expansion coefficients different from each other, damage to the guide members 30 is further curbed.

The first extending portion 61 of the guide member 60 extends in the first direction D1. The end portion 61*a* of the first extending portion 61 is fixed to the restraint plate 8B by the fixing portions 63, and the end portion 61*b* of the first extending portion 61 is engaged with the restraint plate 8A by the engagement portion 64. Thus, the guide member 60 can reliably guide the wirings L along the side surface 2*d* of the module stacked body 2 without being detached from each of the restraint plates 8. Since the cover portions 65 are provided, the end portion 62*a* which functions as a wiring bundling portion is constituted to be able to accommodate the wirings L while bundling the wirings L together on the side surface 2*d*.

The wiring guide portion 62 of the guide member 60 extends in the second direction D2. Thus, the wirings L can be guided in the second direction D2. Since the wiring guide portion 62 is connected to the end portion 61*a* of the first extending portion 61 and disposed along the inner surface 10*b* of the edge portion 10 of the restraint plate 8A, a flow of the cooling fluid flowing out from the flow channels 5*a* is unlikely to be hindered. The wiring guide portion 62 is fixed to the restraint plate 8B by the fixing portions 63. Namely, since the guide member 60 is fixed to the restraint plate 8B by the two fixing portions 63, it is less likely to be detached from the restraint plate 8B.

The fixing portions 63 can move in the second direction D2, and the engagement portion 64 can move in the first direction D1 and the second direction D2. Thus, even when the module stacked body 2 and the guide member 60 expand and contract in the first direction D1 and the second direction D2 with linear expansion coefficients different from each other, damage to the guide member 60 is curbed. In addition, even when the module stacked body 2 expands and contracts in the first direction D1 due to battery reaction, damage to the guide member 60 is curbed.

On the side surface 2*d*, the guide member 60 is provided side by side together with the guide member 70 in the second direction D2. For this reason, the length of each of the guide members 60 and 70 in the second direction D2 can be shortened. Thus, when the module stacked body 2 and the guide members 60 and 70 expand and contract in the second direction D2 with linear expansion coefficients different from each other, damage to the guide members 60 and 70 is further curbed.

In each of the guide members 30 and 60, the engagement portions 35 and 64 are respectively press-fitted into the recessed portions 16 provided in the restraint plate 8. The recessed portions 16 open to the inside in the first direction D1 and extend in the second direction D2. Thus, it is possible to easily realize a constitution in which the engagement portions 35 and 64 can move in the first direction D1 and the second direction D2 while being engaged with the restraint plate 8.

In the guide members 30 and 60, the fixing portions 34 and 63 are inserted through the penetration hole 16*d* penetrating the restraint plate 8 in the third direction D3 or the first direction D1. Accordingly, the fixing portions 34 and 63 can be easily fixed to the restraint plate 8.

Each of the current collectors 5C provided between the power storage modules 3 adjacent to each other in the first direction D1 is provided with the flow channels 5*a* through which the cooling fluid flows along the third direction D3. For this reason, the module stacked body 2 can be efficiently cooled.

The module stacked body 2 is connected to at least one of the voltage detector and the temperature detector disposed between the power storage modules 3 adjacent to each other in the first direction D1. In this case, the state of the power storage modules 3 can be monitored using an external device.

The wirings L are connected to at least one of the voltage detector and the temperature detector included in the detectors 12. Accordingly, the state of the power storage modules 3 can be monitored using an external device.

Second Embodiment

Figure 14:
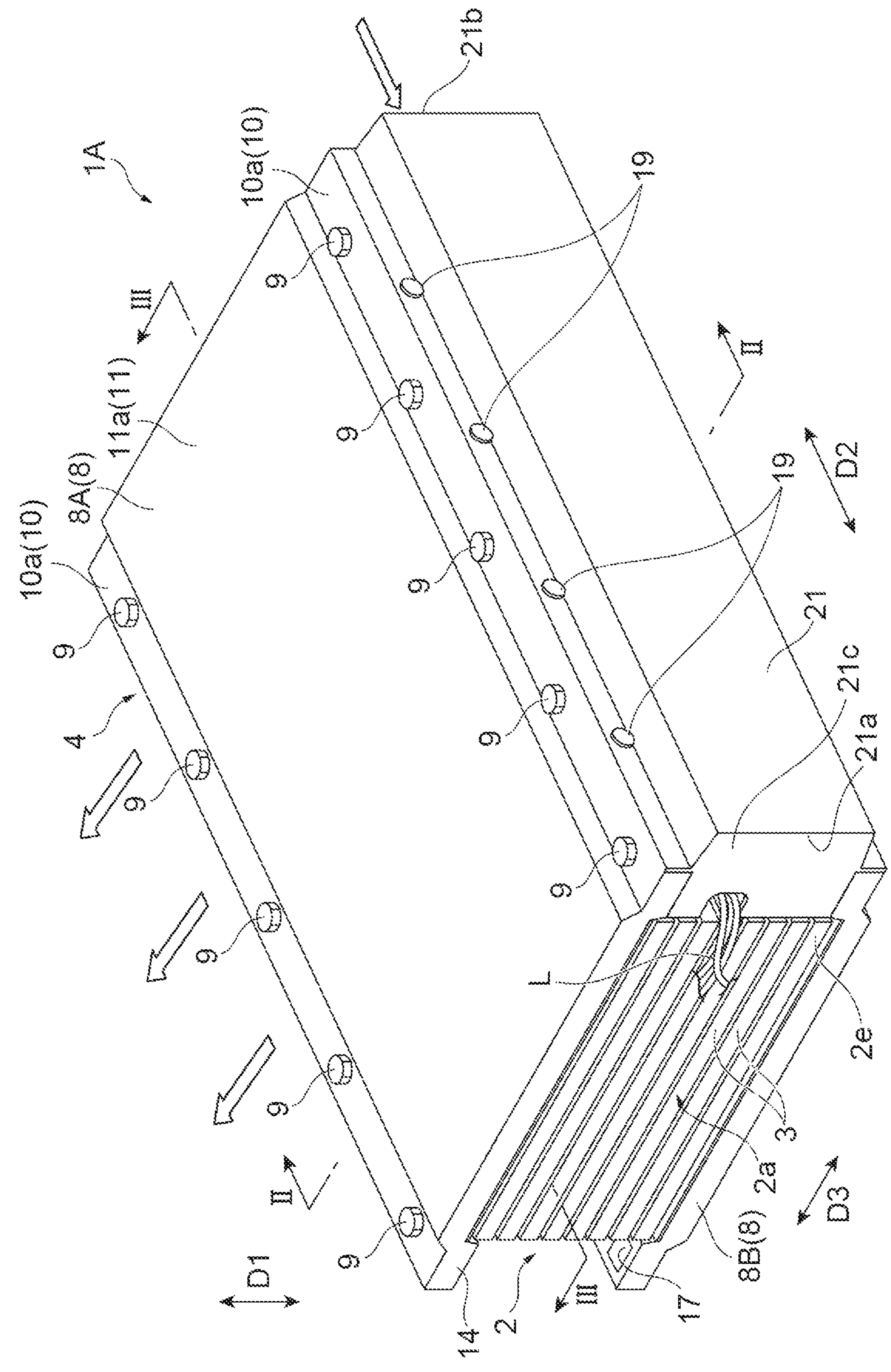
FIG. 14 is a perspective view of a power storage device according to a second embodiment.
Figure 15:
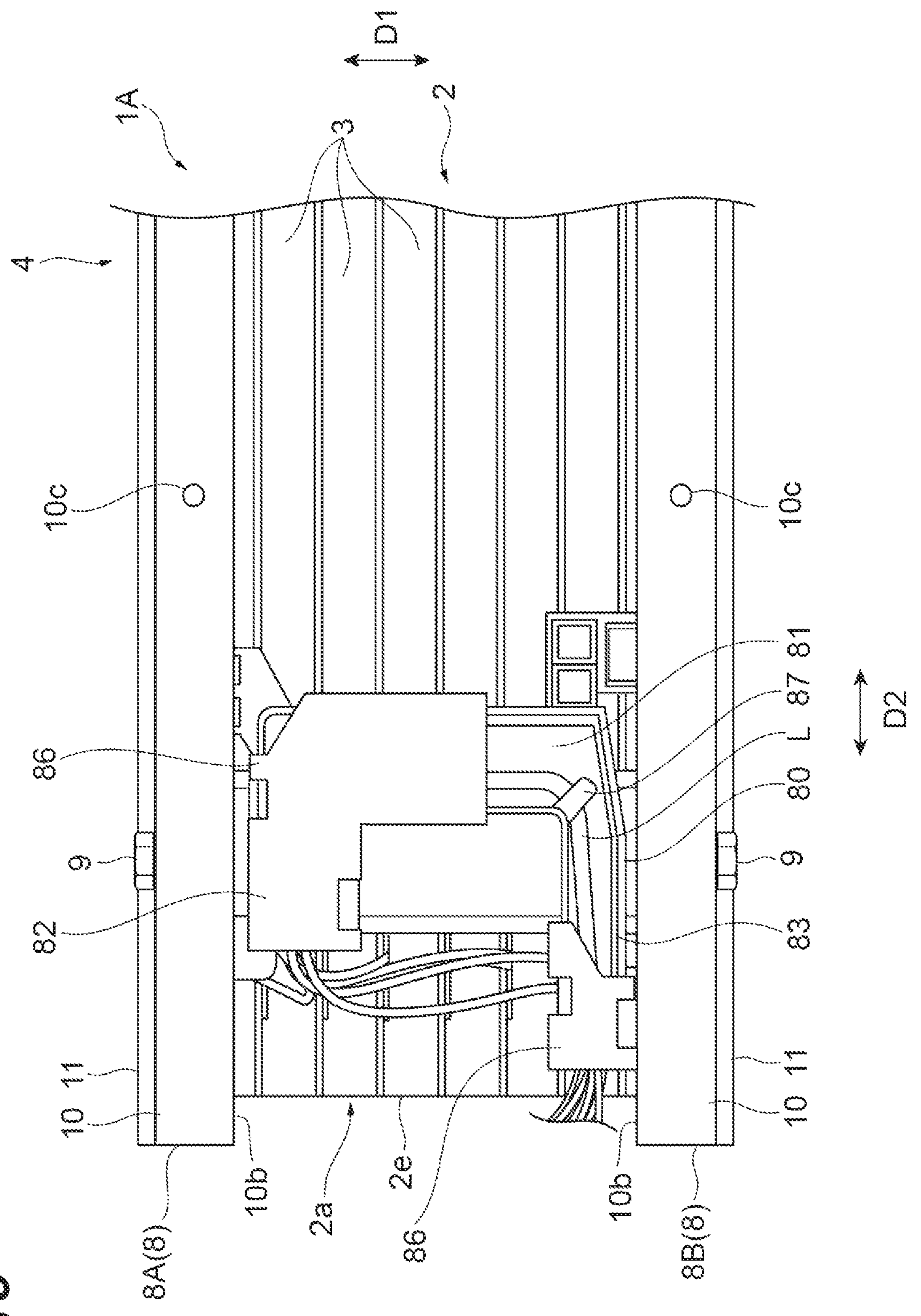
FIG. 15 is a side view of the power storage device in FIG. 14.
Figure 16:
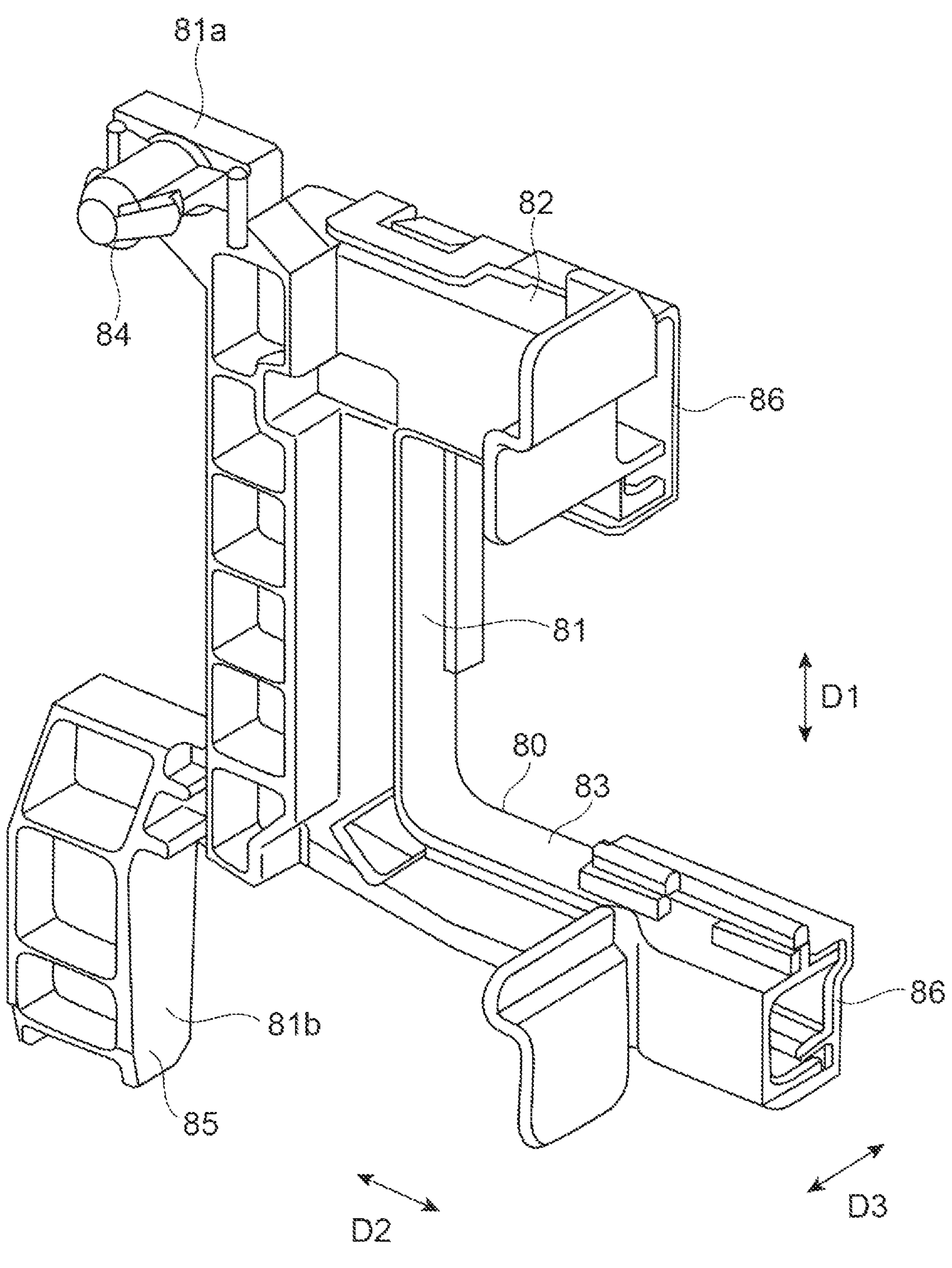
FIG. 16 is a perspective view of a guide member.

With reference to FIGS. 14 to 16, a power storage device 1A according to a second embodiment will be described with a focus on points different from those of the power storage device 1. In the power storage device 1A, the number of power storage modules 3 is eight, the number of current collectors 5 is nine, and the number of wirings L is ten. When the power storage modules 3 are compact batteries, or when heat is unlikely to be accumulated due to a small number of stacked power storage modules 3, the space S formed between the duct 21 and the side surface 2*c* (refer to FIG. 2) may not be divided in the power storage device 1A. The one end 21*a* of the duct 21 is entirely covered by the lid 21*c* except for the holes through which the wirings L pass. The other end 21*b* of the duct 21 entirely opens and constitutes the inlet port of the space S. The cooling fluid which has flowed in through the inlet port (the other end 21*b*) of the space S flows in the space S and is guided to the flow channels 5*a* (refer to FIG. 3). The cooling fluid flows through the flow channels 5*a* and flows out from the side surface 2*d* side. In the space S, the cooling fluid flows along one direction from the other end 21*b* toward the one end 21*a*. A blower (not illustrated) is attached to the inlet port of the space S.

In place of the pair of guide members 30, the power storage device 1A includes a guide member 80 attached to the side surface 2*c* and guiding the wirings L along the side surface 2*c*. The guide member 80 is provided in the vicinity of the end portion 2*a* on the side surface 2*c*. For example, the guide member 80 is made of an insulating resin such as polypropylene (PP). For example, the portions of the guide member 80 are integrally formed as one member by injection molding of a resin. For example, a linear expansion coefficient of the guide member 80 is larger than the linear expansion coefficients of the restraint plates 8 and the bolt collars 9*b*. For example, the guide member 80 is formed of a material which is the same as that of the guide members 30.

The guide member 80 has a first extending portion 81, a second extending portion 82, a wiring guide portion 83, a fixing portion 84, an engagement portion 85, a plurality of (two in the present embodiment) cover portions 86, and a projecting portion 87. The first extending portion 81 extends in the first direction D1. The second extending portion 82 is connected to an end portion 81*a* of the first extending portion 81 and extends to the end portion 2*a* side in the second direction D2. The wiring guide portion 83 is connected to an end portion 81*b* of the first extending portion 81 and extends to the end portion 2*b* side in the second direction D2. For this reason, the guide member 80 has a U-shape in its entirety.

The first extending portion 81 is a groove member having a semi-cylindrical shape cut out in half in the circumferential direction or a U-shape in a cross section and has a wiring bundling portion constituted to be able to accommodate the wirings L therein. The wirings L connected to the plurality of power storage modules 3 are bundled together on the side surface 2*c* by the wiring bundling portion. The first extending portion 31 is disposed on the side surface 2*c* such that the cutout part in the circumferential direction is positioned on a side opposite to the side surface 2*c*.

The second extending portion 82 is disposed on the inner surface of the edge portion 10 of the restraint plate 8A. The wiring guide portion 83 is disposed on the inner surface 10*b* of the edge portion 10 of the restraint plate 8B. The second extending portion 82 and the wiring guide portion 83 are groove members having a semi-cylindrical shape cut out in half in the circumferential direction or a U-shape in a cross section and constituted to be able to accommodate the wirings L therein. The second extending portion 82 and the wiring guide portion 83 are disposed on the side surface 2*c* such that the cutout part in the circumferential direction is positioned on a side opposite to the side surface 2*c*.

The fixing portion 84 is provided in the end portion 81*a* of the first extending portion 81. The fixing portion 84 is fixed to the restraint plate 8A. The fixing portion 84 has a structure equivalent to that of the fixing portion 34. Similar to the fixing portion 34, the fixing portion 84 is fixed to the penetration hole 16*d* provided in the side wall 16*a* of the recessed portion 16. Similar to the fixing portion 34, the fixing portion 84 is fixed to the restraint plate 8A so as to be movable in the second direction D2 within the range of the penetration hole 16*d*.

The engagement portion 85 is provided in the end portion 81*b* of the first extending portion 81. The engagement portion 85 is provided in a manner of protruding from the end portion 81*b* to the restraint plate 8B side in the first direction D1 and is engaged with the restraint plate 8B so as to be movable in the first direction D1 and the second direction D2. The engagement portion 85 has a structure equivalent to that of the engagement portion 35. Similar to the engagement portion 35, the engagement portion 85 is engaged with the recessed portion 16.

One cover portion 86 continuously covers the cutout part of the first extending portion 81 and the cutout part of the second extending portion 82. The other cover portion 86 covers the cutout part of the wiring guide portion 83. The plurality of projecting portion 87 are provided in the cutout part of the first extending portion 81 and curb detachment of the wirings L from the first extending portion 81.

The wirings L drawn out from the detectors 12 in the end portion 2*a* to the side surface 2*c* are guided to the end portion 2*a* along the side surface 2*c* by the guide member 80. In the present embodiment, since each of the detectors 12 in the end portion 2*a* includes both the temperature detector and the voltage detector, the temperature and the voltage can be monitored simply by the detectors 12 in the end portion 2*a*. Thus, the distance for guiding the wirings L along the side surface 2*c* can be shortened. In place of the guide members 60 and 70, the pair of guide members 30 may be attached to the side surface 2*d* of the power storage device 1A and guide the wirings L along the side surface 2*d*.

Operation and Effects

Operation and effects of the power storage device 1A will be described with a focus on points different from those of the power storage device 1. In the power storage device 1A, the first extending portion 81 of the guide member 80 extends in the first direction D1. The end portion 81*a* of the first extending portion 81 is fixed to the restraint plate 8A by the fixing portion 84, and the end portion 81*b* of the first extending portion 81 is engaged with the restraint plate 8B by the engagement portion 85. Thus, the guide member 80 can reliably guide the wirings L along the side surface 2*c* of the module stacked body 2 without being detached from each of the restraint plates 8.

The engagement portion 85 can move in the first direction D1 and the second direction D2. Thus, even when the module stacked body 2 and the guide member 80 expand and contract in the first direction D1 and the second direction D2 with linear expansion coefficients different from each other, damage to the guide member 80 is curbed. The fixing portion 84 can move in the second direction D2. Thus, damage to the guide member 80 is further curbed.

The present disclosure is not limited to the foregoing embodiments.

In the foregoing embodiments, the power storage device 1 includes the pair of guide members 30, the guide member 60, and the guide member 70. However, it need only include at least one of the guide members 30 and the guide member 60. The power storage device 1A need only include at least the guide member 80.

In the foregoing embodiments, the outer surface 10*a* is positioned on the inside of the outer surface 11*a* in the first direction D1. However, the outer surface 10*a* may be positioned on the same plane as the outer surface 11*a* or may be positioned on the outside of the outer surface 11*a* in the first direction D1. The inner surface 10*b* is positioned on the inside of the inner surface 11*b* in the first direction D1. However, the inner surface 10*b* may be positioned on the same plane as the inner surface 11*b* or may be positioned on the outside of the inner surface 11*b* in the first direction D1.

In the foregoing embodiments, the area of each of the current collectors 5 viewed in the first direction D1 is smaller than the area of each of the power storage modules 3. However, from a viewpoint of improvement in heat dissipation, the area thereof may be the same as the area of each of the power storage modules 3 or may be larger than the area of each of the power storage modules 3.

The insulating plate 20 may have a box shape further having a pair of side portions connected to both end portions of a bottom portion 20*a* in the second direction D2 and extending in the first direction D1.

As can be ascertained from the foregoing description of the embodiments and modification examples, this specification includes disclosure of the following aspects.

What is claimed is:

1. A power storage device comprising:

a module stacked body including a plurality of power storage modules stacked in a first direction and having a first side surface extending in the first direction and a second direction orthogonal to the first direction and a second side surface adjacent to the first side surface and extending in the first direction and a third direction orthogonal to the first side surface and the second direction;

a first restraint plate and a second restraint plate stacked on both sides of the module stacked body in the first direction and applying a restraint load to the module stacked body in the first direction;

a wiring connected to the module stacked body; and a guide member coupled to the first restraint plate and the second restraint plate and disposing the wiring on the first side surface, wherein the guide member includes:

a wiring guide portion extending in the second direction and guiding the wiring toward the second side surface; and a first extending portion connected to the wiring guide portion and extending in the first direction, and wherein the first extending portion includes:

a first fixing portion provided in a first end portion that is one end portion of the first extending portion in the first direction and fixed to the first restraint plate; and a first engagement portion provided in a second end portion that is another end portion of the first extending portion in the first direction and engaged with the second restraint plate so as to be movable in the first direction and the second direction when the power storage modules expand and contract.

2. The power storage device according to claim 1, wherein the guide member further includes a second extending portion connected to the wiring guide portion at a position spaced apart from the first extending portion in the second direction and extending in the first direction, wherein the first extending portion is provided at a place closer to the second side surface than the second extending portion, and wherein the second extending portion includes:

a second fixing portion provided in a third end portion that is one end portion of the second extending portion in the first direction and fixed to the first restraint plate, and a second engagement portion provided in a fourth end portion that is another end portion of the second extending portion in the first direction and engaged with the second restraint plate so as to be movable in the first direction and the second direction.

3. The power storage device according to claim 2, further comprising a duct covering the first side surface and forming a space between the duct and the first side surface, wherein a cooling fluid flows along the second direction in the space, wherein the wiring guide portion divides the space in the first direction by a leg portion protruding in the third direction toward the first side surface.

4. The power storage device according to claim 2, wherein the wiring guide portion is spaced apart from each of the first end portion and the second end portion in the first direction and is spaced apart from each of the third end portion and the fourth end portion in the first direction.

5. The power storage device according to claim 1, wherein the first restraint plate includes a first edge portion adjacent to the module stacked body in the third direction when viewed in the first direction, wherein the wiring guide portion is disposed on the first edge portion and extends in the second direction along the first edge portion, the wiring guide portion is connected to the first end portion close to a fifth end portion that is one end portion of the wiring guide portion in the second direction, and the wiring guide portion includes a third fixing portion provided in a sixth end portion that is another end portion of the wiring guide portion in the second direction and fixed to the first restraint plate, and wherein the fifth end portion is provided at a place closer to the second side surface than the sixth end portion.

6. The power storage device according to claim 1, wherein a plurality of the guide members are provided side by side in the second direction.

7. The power storage device according to claim 1, wherein the guide member includes a wiring bundling portion bundling a plurality of the wirings together on the first side surface.

8. The power storage device according to claim 1, wherein the module stacked body further includes a current collector electrically connecting the power storage modules adjacent to each other in the first direction and provided between the power storage modules adjacent to each other in the first direction, and wherein the current collector is provided with a flow channel through which a cooling fluid flows along the third direction.

9. The power storage device according to claim 1, wherein the second restraint plate includes a second edge portion adjacent to the module stacked body in the third direction when viewed in the first direction, wherein the second edge portion includes:

an inner surface facing the guide member in the first direction, and a recessed portion opening on the inner surface and extending in the second direction, and wherein the first engagement portion is press-fitted into the recessed portion.

10. The power storage device according to claim 1, wherein the first fixing portion is inserted through a penetration hole penetrating the first restraint plate in the first direction or a penetration hole penetrating the first restraint plate in the third direction.

11. The power storage device according to claim 1, wherein the wiring is connected to at least one of a voltage detector and a temperature detector disposed between the power storage modules adjacent to each other in the first direction.

12. The power storage device according to claim 1 further comprising a wiring bending portion provided in an end portion of the wiring guide portion and bending the wiring from the first side surface toward the second side surface, the end portion being close to the second side surface.

* * * * *